US011350437B2

(12) United States Patent
Xiong et al.

(10) Patent No.: US 11,350,437 B2
(45) Date of Patent: May 31, 2022

(54) APPARATUS AND METHOD FOR UPLINK CONTROL SIGNALING IN MULTI-TRANSMISSION RECEPTION POINT OPERATION FOR NEW RADIO, AND DEMODULATION REFERENCE SIGNAL DESIGN

(71) Applicant: Apple Inc., Cupertino, CA (US)

(72) Inventors: Gang Xiong, Portland, OR (US); Joonyoung Cho, Portland, OR (US); Alexei Davydov, Nizhny Novgorod (RU); Seunghee Han, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 73 days.

(21) Appl. No.: 16/645,928

(22) PCT Filed: Sep. 10, 2018

(86) PCT No.: PCT/CN2018/104847
§ 371 (c)(1),
(2) Date: Mar. 10, 2020

(87) PCT Pub. No.: WO2019/047950
PCT Pub. Date: Mar. 14, 2019

(65) Prior Publication Data
US 2020/0281011 A1    Sep. 3, 2020

Related U.S. Application Data

(60) Provisional application No. 62/567,178, filed on Oct. 2, 2017, provisional application No. 62/556,959, filed on Sep. 11, 2017.

(51) Int. Cl.
*H04W 72/12* (2009.01)
*H04L 1/18* (2006.01)
(Continued)

(52) U.S. Cl.
CPC ....... *H04W 72/1278* (2013.01); *H04L 1/1812* (2013.01); *H04L 5/0053* (2013.01); *H04W 84/042* (2013.01)

(58) Field of Classification Search
CPC ..................................................... H04W 72/12
See application file for complete search history.

(56) References Cited

U.S. PATENT DOCUMENTS

| 9,854,600 | B2 | 12/2017 | Park et al. | |
| 2018/0262308 | A1* | 9/2018 | Si | H04L 5/0053 |
| 2019/0098580 | A1* | 3/2019 | Babaei | H04W 52/146 |

FOREIGN PATENT DOCUMENTS

| WO | 2013/046023 A1 | 4/2013 |
| WO | 2014/172515 A1 | 10/2014 |
| WO | 2017/014572 A1 | 1/2017 |

OTHER PUBLICATIONS

International Search Report dated Nov. 29, 2018 for International Application No. PCT/CN2018/104847.
(Continued)

*Primary Examiner* — Sulaiman Nooristany
(74) *Attorney, Agent, or Firm* — Eschweiler & Potashnik, LLC

(57) ABSTRACT

Techniques discussed herein can facilitate multi-transmission reception point (multi-TRP) operation for new radio (NR). One example apparatus may be employed at a user equipment (UE), and may comprise: an interface configured to enable the UE to communicate with two or more TRPs; and a processor that is configured to generate uplink control information (UCI) for each of the TRPs, schedule single or multiple uplink channels to carry the UCI, so that the UCI is transmitted individually or in combination to the TRPs via the interface, wherein the uplink channels comprise NR physical uplink control channel (PUCCH) and/or NR physical uplink shared channel (PUSCH). Techniques discussed (Continued)

herein also can facilitate demodulation reference signal design for short physical uplink control channel carrying more than 2-bit UCI for new radio.

22 Claims, 24 Drawing Sheets

(51) Int. Cl.
*H04L 5/00* (2006.01)
*H04W 84/04* (2009.01)

(56) References Cited

OTHER PUBLICATIONS

"On remaining details of short PUCCH for UCI of more than 2 bits." Source: Nokia, Nokia Shanghai Bell. Agenda item: 6.1.3.2.1.2. 3GPP TSG RAN WG1 #90, Prague, Czech Republic, Aug. 21-25, 2017. R1-1714073.

"DL multi-TRP and multi-panel transmission." Source: Ericsson. Agenda Item: 6.1.2.1.6. 3GPP TSG-RAN WG1 Meeting #90, Prague, Czech Republic, Aug. 21-25, 2017. R1-1714275.

Huawei et al: "Discussion on UL multi-panel/TRP operation",3GPP Draft; R1-1714345, 3rd Generation Partnership Project (3GPP), Mobile Competence Centre ; 650, Route Des Lucioles ; F-06921 Sophia-Antipolis Cedex, France; vol. RAN WG1, No. Prague, Czech Republic; Aug. 21, 2017-Aug. 25, 2017 Aug. 20, 2017 (Aug. 20, 2017), XP051317130.

Huawei et al: "Multiplexing between PUCCHs", 3GPP Draft; R1-1714331, 3rd Generation Partnership Project (3GPP), Mobile Competence Centre ; 650, Route Des Lucioles ; F-06921 Sophia-Antipolis Cedex, France; vol. RAN WG1, No. Prague, Czech Republic; Aug. 21, 2017-Aug. 25, 2017 Aug. 20, 2017 (Aug. 20, 2017), XP051317116.

Extended European Search Report dated May 3, 2021 in connection with European Patent Application 18854370.6.

* cited by examiner

APPARATUS AND METHOD FOR UPLINK CONTROL SIGNALING IN MULTI-TRANSMISSION RECEPTION POINT OPERATION FOR NEW RADIO, AND DEMODULATION REFERENCE SIGNAL DESIGN

PRIORITY CLAIM

This application is a National Phase entry application of International Patent Application No. PCT/CN2018/104847 filed Sep. 10, 2018, which claims priority to to U.S. Provisional Patent Applications 62/556,959 filed Sep. 11, 2017, entitled "UPLINK CONTROL SIGNALING IN MULTI-TRANSMISSION RECEPTION POINT FOR NEW RADIO", and Ser. No. 62/567,178 filed Oct. 2, 2017, entitled "DEMODULATION REFERENCE SIGNAL DESIGN FOR SHORT PHYSICAL UPLINK CONTROL CHANNEL WITH MORE THAN 2 BITS UPLINK CONTROL INFORMATION", and is hereby incorporated by reference in its entirety.

TECHNICAL FIELD

The present disclosure generally relates to the field of wireless communication, and more specifically to techniques employable in connection with uplink control signaling for New Radio (NR), and demodulation reference signal design for short physical uplink control channel (PUCCH).

BACKGROUND

Mobile communication has evolved significantly from early voice systems to today's highly sophisticated integrated communication platform. The next generation wireless communication system, fifth generation (5G), or new radio (NR), will provide access to information and sharing of data anywhere, anytime by various users and applications. NR is expected to be a unified network/system that can meet vastly different and sometimes conflicting performance dimensions and services. These diverse multi-dimensional targets for NR are driven by different services and applications. In general, NR will evolve based on 3GPP (Third Generation Partnership Project) LTE (Long Term Evolution)-Advanced with additional potential new radio access technologies (RATS) to enrich peoples' lives with better, simpler and seamless wireless connectivity solutions. NR will enable everything connected by wireless and deliver fast, rich contents and services.

BRIEF DESCRIPTION OF THE DRAWINGS

Embodiments of the disclosure will be readily understood from the detailed description given below in reference to the accompanying drawings which illustrate generally, by way of example, but not by way of limitation, various features or embodiments of the present disclosure. The same reference numbers may be used in different drawings to identify the same or similar elements. Numbers provided in flow charts and processes are provided for clarity in illustrating steps or operations, and do not necessarily indicate a particular order or sequence of the steps or operations.

DETAILED DESCRIPTION

In the following description, for purposes of explanation and not limitation, numerous specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and processes are omitted so as not to obscure the description of the various embodiments with unnecessary detail.

References to the phrases "one embodiment", "an embodiment", "one example", "an example" and the like throughout the disclosure indicate that the embodiment described may include a particular feature, structure, step, material or characteristic; however, every embodiment may not necessarily include the particular feature, structure, step, material or characteristic. Moreover, such phrases are not necessarily referring to the same embodiment. For the purposes of the disclosure, the phrase "A and/or B" means (A), or (B), or (A and B).

Figure 1:
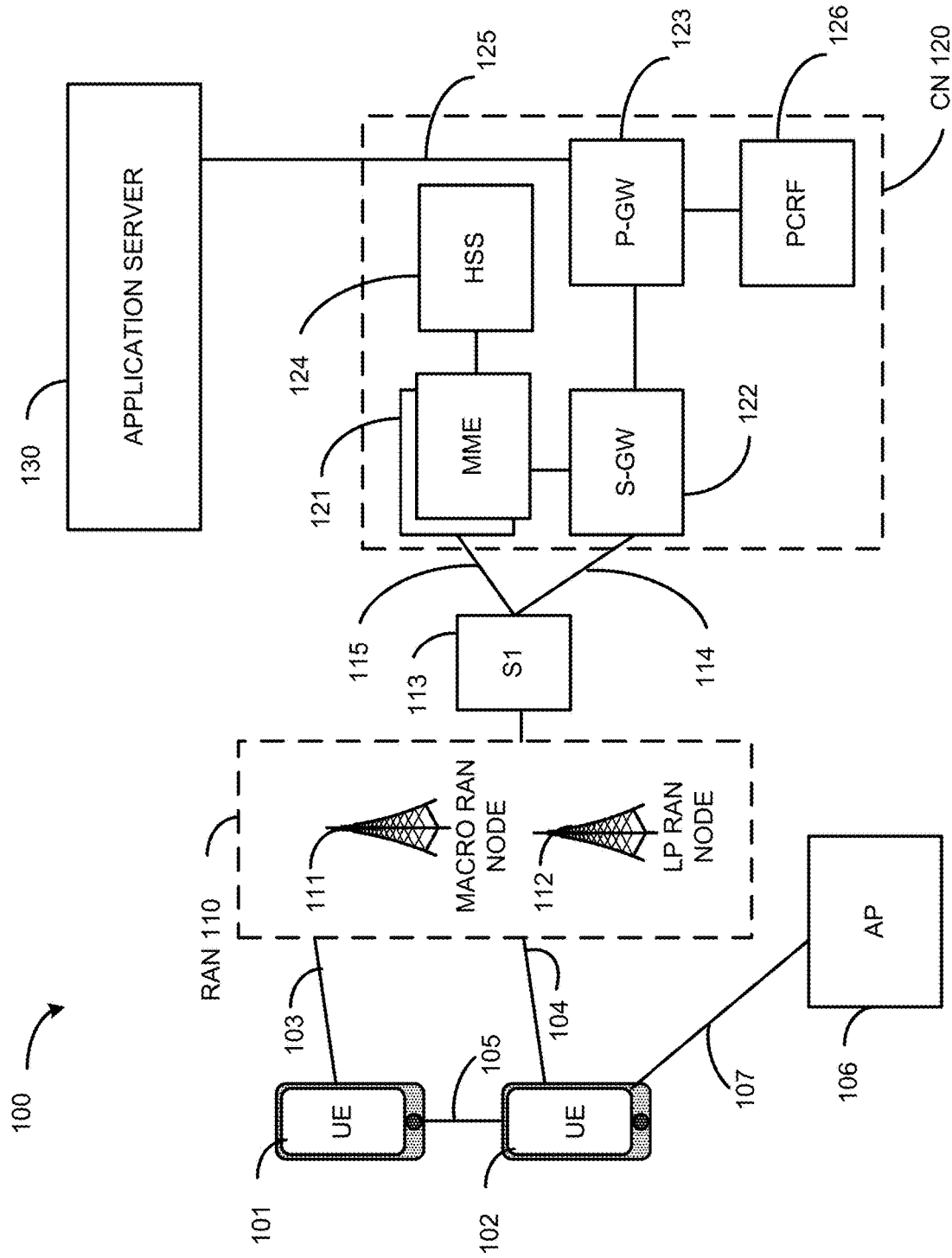
FIG. 1 illustrates example architecture of a system of a network in accordance with some embodiments.

Embodiments described herein may be implemented into a system using any suitably configured hardware and/or software. FIG. 1 illustrates example architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as personal data assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate a SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
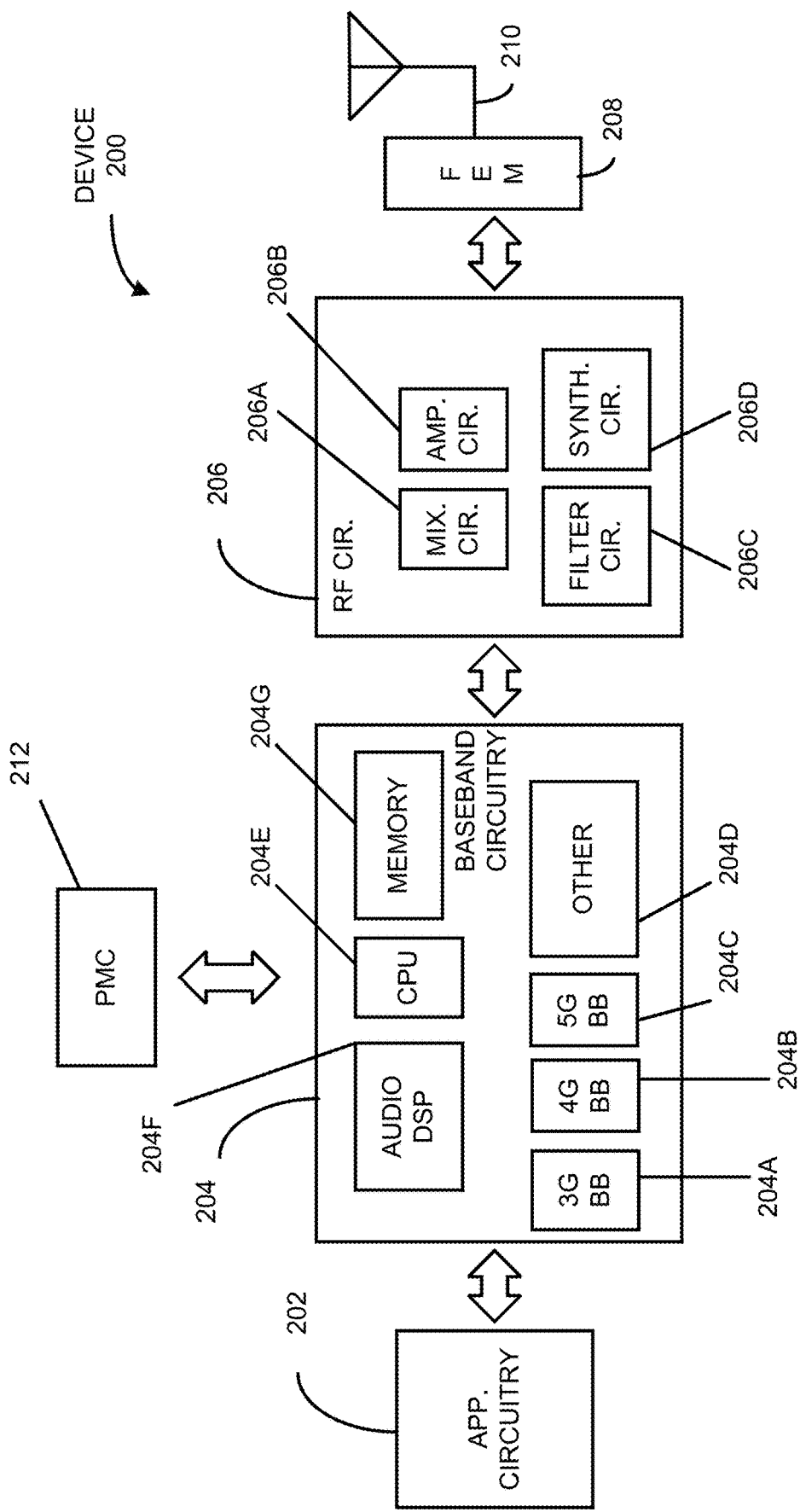
FIG. 2 illustrates example components of a device in accordance with some embodiments.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/ storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206A, amplifier circuitry 206B and filter circuitry 206C. In some embodiments, the transmit signal path of the RF circuitry 206 may include filter circuitry 206C and mixer circuitry 206A. RF circuitry 206 may also include synthesizer circuitry 206D for synthesizing a frequency for use by the mixer circuitry 206A of the receive signal path and the transmit signal path. In some embodiments, the mixer circuitry 206A of the receive signal path may be configured to down-convert RF signals received from the FEM circuitry 208 based on the synthesized frequency provided by synthesizer circuitry 206D. The amplifier circuitry 206B may be configured to amplify the down-converted signals and the filter circuitry 206C may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206A of the receive signal path may comprise passive mixers, although the scope of the embodiments is not limited in this respect.

In some embodiments, the mixer circuitry 206A of the transmit signal path may be configured to up-convert input baseband signals based on the synthesized frequency provided by the synthesizer circuitry 206D to generate RF output signals for the FEM circuitry 208. The baseband signals may be provided by the baseband circuitry 204 and may be filtered by filter circuitry 206C.

In some embodiments, the mixer circuitry 206A of the receive signal path and the mixer circuitry 206A of the transmit signal path may include two or more mixers and may be arranged for quadrature downconversion and upconversion, respectively. In some embodiments, the mixer circuitry 206A of the receive signal path and the mixer circuitry 206A of the transmit signal path may include two or more mixers and may be arranged for image rejection (e.g., Hartley image rejection). In some embodiments, the mixer circuitry 206A of the receive signal path and the mixer circuitry 206A may be arranged for direct downconversion and direct upconversion, respectively. In some embodiments, the mixer circuitry 206A of the receive signal path and the mixer circuitry 206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206D may be a fractional-N synthesizer or a fractional N/N+1 synthesizer, although the scope of the embodiments is not limited in this respect as other types of frequency synthesizers may be suitable. For example, synthesizer circuitry 206D may be a delta-sigma synthesizer, a frequency multiplier, or a synthesizer comprising a phase-locked loop with a frequency divider.

The synthesizer circuitry 206D may be configured to synthesize an output frequency for use by the mixer circuitry 206A of the RF circuitry 206 based on a frequency input and a divider control input. In some embodiments, the synthesizer circuitry 206D may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206D of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
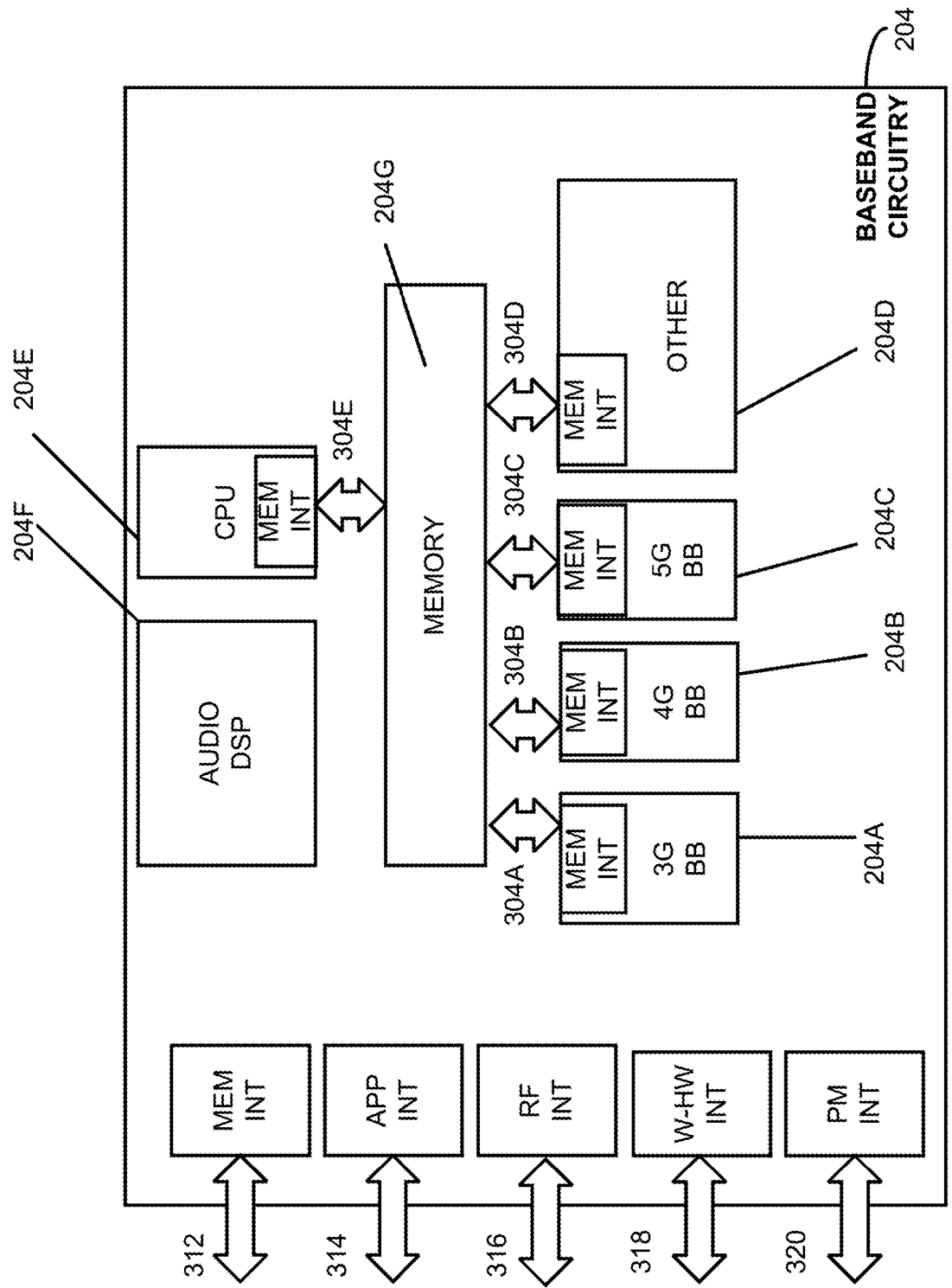
FIG. 3 illustrates example interfaces of baseband circuitry in accordance with some embodiments.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
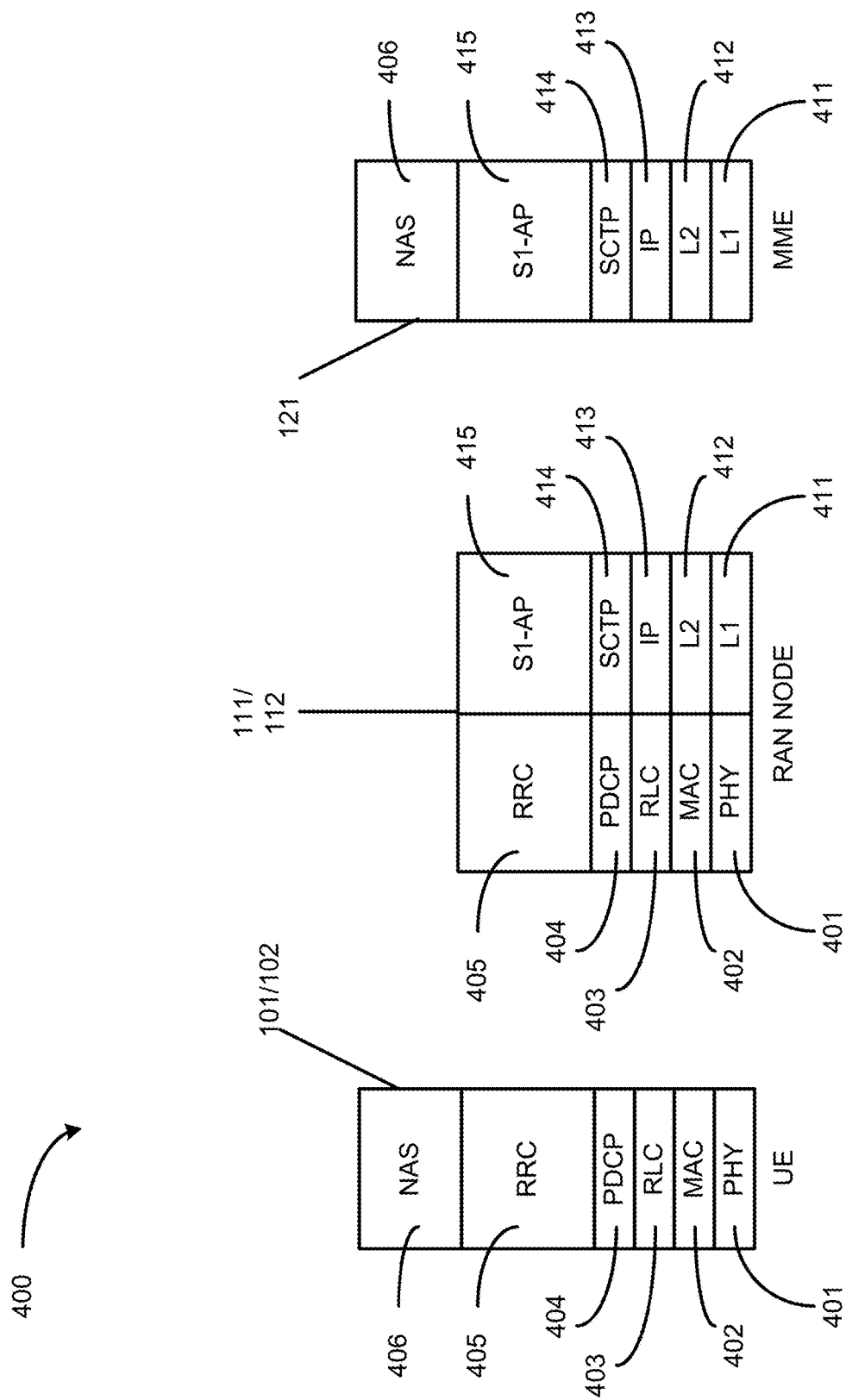
FIG. 4 is an illustration of a control plane protocol stack in accordance with some embodiments.

FIG. 4 is an illustration of a control plane protocol stack in accordance with some embodiments. In this embodiment, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
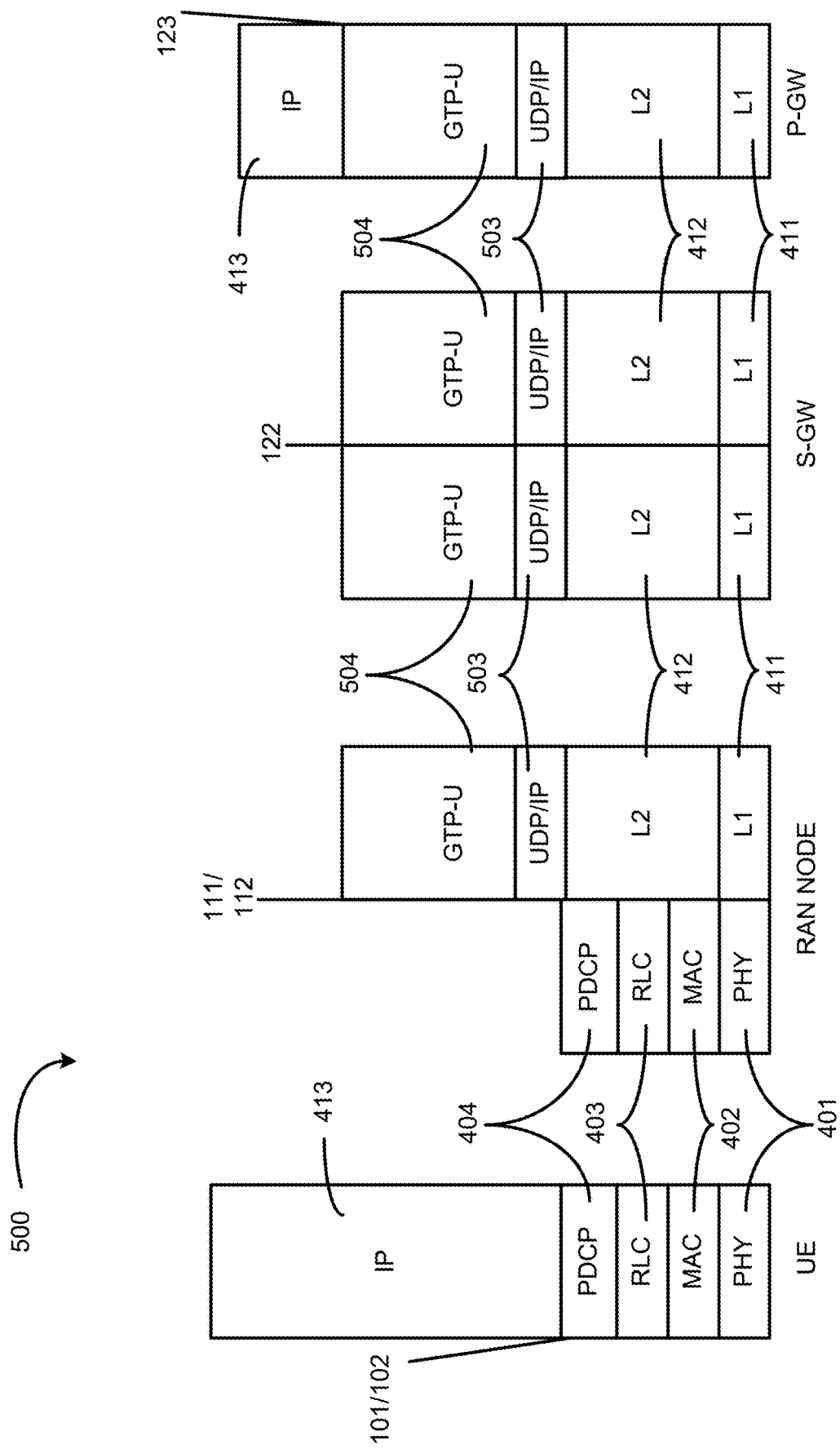
FIG. 5 is an illustration of a user plane protocol stack in accordance with some embodiments.

FIG. 5 is an illustration of a user plane protocol stack in accordance with some embodiments. In this embodiment, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an 55/58a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
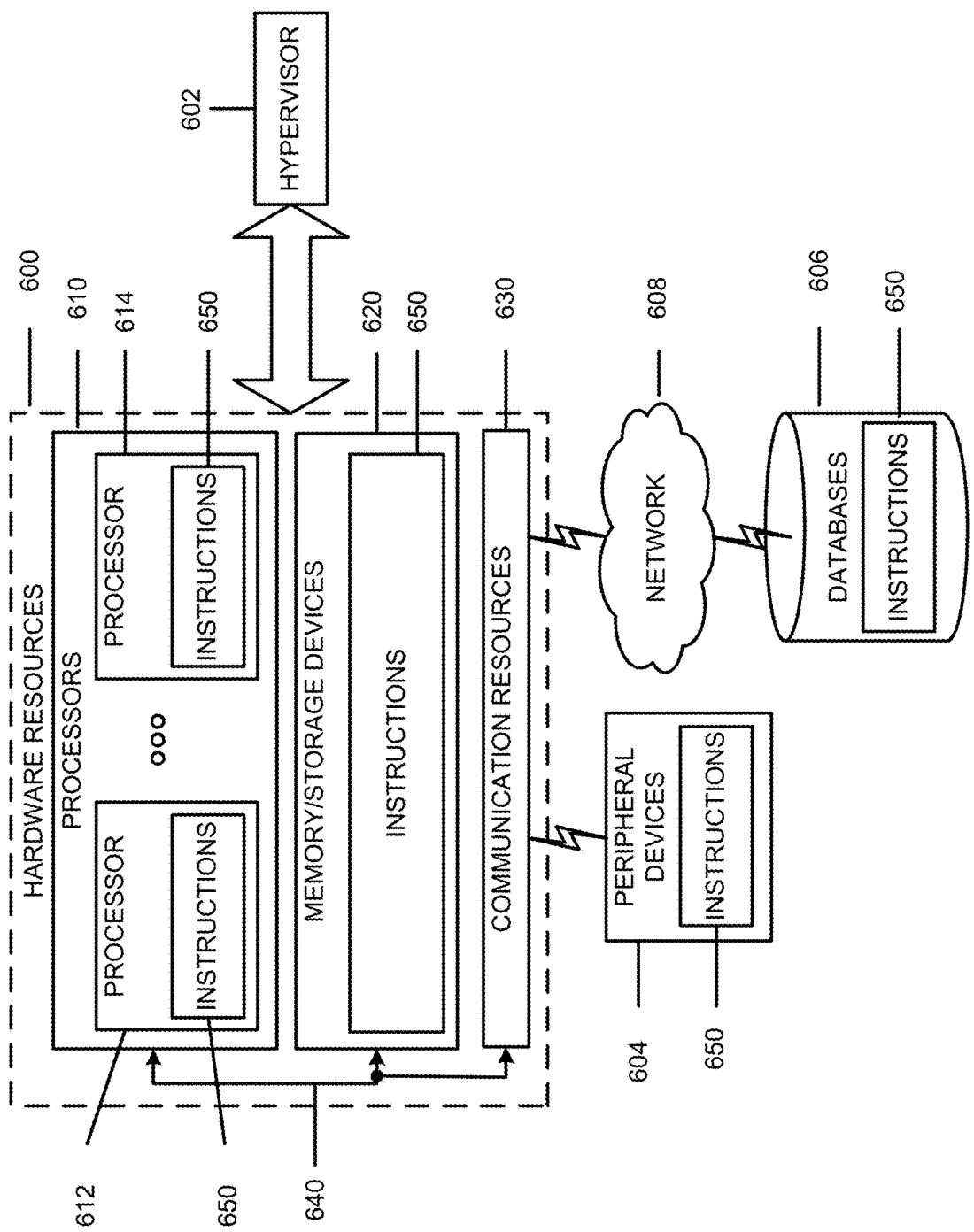
FIG. 6 is a block diagram illustrating components, according to some embodiments, able to read instructions from a machine-readable or computer-readable medium and implement one or more of the embodiments discussed herein.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For embodiments where node virtualization (e.g., NFV) is utilized, a hypervisor 602 may be executed to provide an execution environment for one or more network slices/sub-slices to utilize the hardware resources 600.

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

For fifth generation (5G) or new radio (NR) system, high frequency band communication has attracted significantly attention from the industry, since it may provide wider bandwidth to support an integrated communication system in future. Beam forming may be a critical technology for implementation of the high frequency band communication due to the fact that gain of the beam forming may compensate the severe path loss caused by atmospheric attenuation, improve signal-to-noise ratio (SNR), and enlarge a coverage area. By aligning a transmission beam from a network node to a target UE, the radiated energy may be focused for higher energy efficiency, and the mutual interference between the targeted UE and other UE(s) may be suppressed.

In case when a UE is equipped with multiple antenna panels or antenna subarrays, the UE may be able to transmit/receive signals to/from multiple transmission reception point (TRP) simultaneously using different beams. This multi-TRP operation may facilitate increasing the number of layers for data transmission, and thereby improving the throughput of the entire system.

Figure 7:
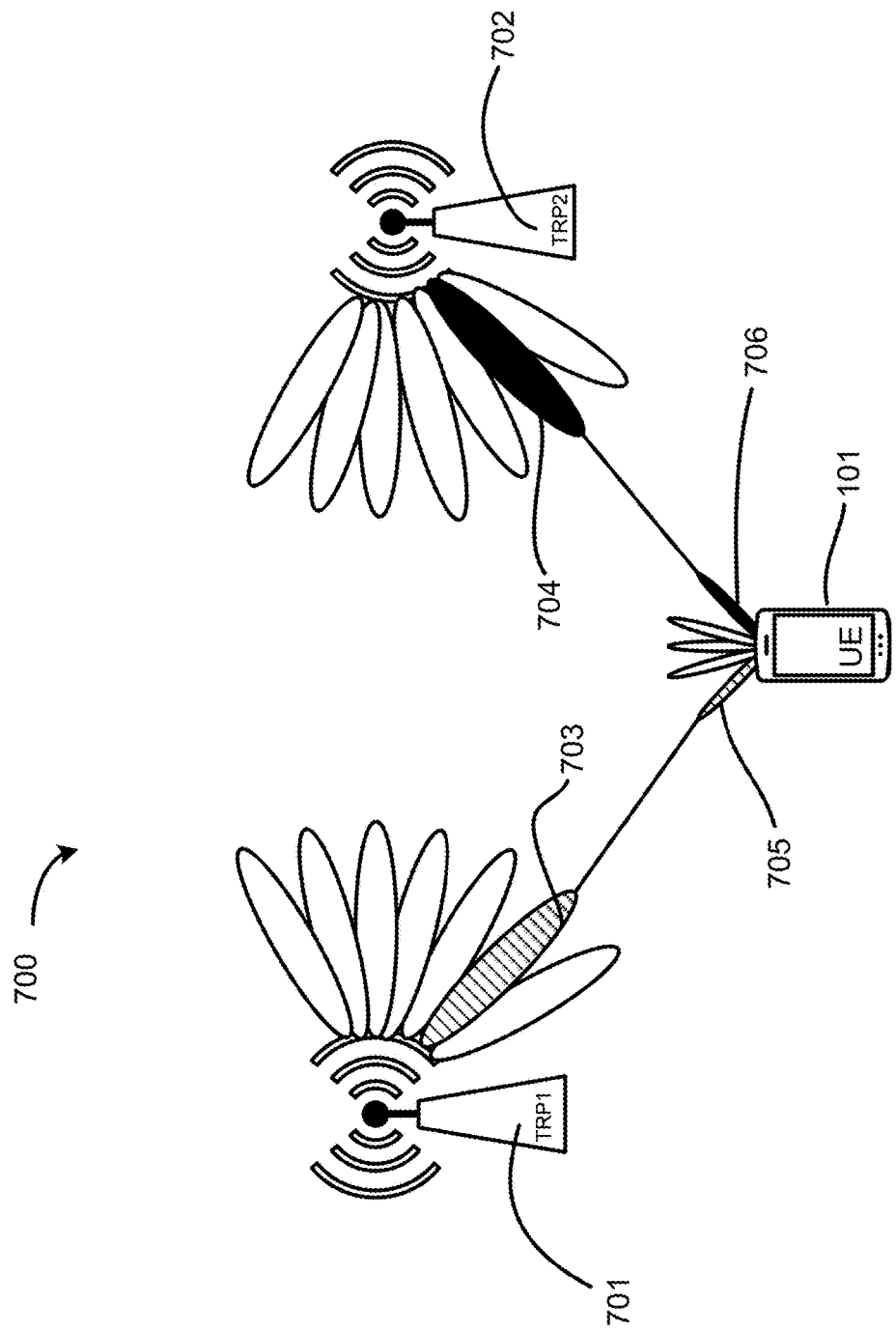
FIG. 7 is a diagram illustrating an example of multiple transmission reception point (multi-TRP) operation in accordance with some embodiments.

FIG. 7 is a diagram illustrating an example 700 of multi-TRP operation in accordance with some embodiments. Although only two TRPs (i.e. TRP1 701 and TRP2 702) are shown in this example, more than two TRPs may be involved in the multi-TRP operation.

In one example, the two TRPs 701 and 702 may be located in one and the same radio access network (RAN) node, e.g. macro RAN node 111 shown in FIG. 1, which may be referred to as a base station (BS), NodeB (NB), evolved NodeB (eNB), next Generation NodeB (gNB), and so forth. For example, the TRPs may be two transceivers or two remote headends (RHs) located at a base station, and may be controlled or coordinated by a controller within the base station.

In another example, the two TRPs 701 and 702 may be located in two different networks nodes. For example, TRP1 701 may be part of one base station, while TRP2 702 may be part of another base station. In this case, said TRP1 and TRP2 are controlled or coordinated by their respective base station controllers (BSCs) and/or a controller or coordinator at a higher level. For example, the coordination between the TRPs may be performed via an ideal backhaul (e.g. optical fiber).

As shown in FIG. 7, the two TRPs 701 and 702 may simultaneously transmit downlink (DL) signals to a UE (e.g.

UE 101 of FIG. 1), or otherwise simultaneously receive uplink (UL) signals from the UE, using different beams 703 and 704 respectively.

In this example, the UE 101 may be equipped with two or more antenna panels or antenna subarrays. Thus, the UE 101 may be capable of supporting the multi-TRP operation, by transmitting the UL signals to different TRPs or receiving the DL signals from different TRPs simultaneously using different beams.

Either the DL signals or the UL signals may include user data and/or control signaling. The DL signals may be carried by one or more downlink channels, such as physical downlink shared channel (PDSCH), physical downlink control channel (PDCCH) and so on. The UL signals may be carried by one or more uplink channels, such as physical uplink shared channel (PUSCH), physical uplink control channel (PUCCH) and so on. In an example, the PDSCH, PDCCH, PUSCH and PUCCH discussed in the disclosure may be new radio (NR) PDSCH, NR PDCCH, NR PUSCH and NR PUCCH, respectively.

For example, the PDSCH may carry user data and/or higher-layer signaling to the UE. The PDCCH may carry information about transport format and resource allocations related to the PDSCH channel, among other things.

For multi-TRP operation in DL, multiple PDSCHs may be transmitted simultaneously from several TRPs (e.g. TRP1 and TRP2 in FIG. 7) in different beam pair links (BPLs), so as to increase the number of transmission layers and data throughput. Note that it was agreed in new radio (NR) that maximum number of supported NR PDCCHs corresponding to the scheduled PDSCHs that a UE can be expected to receive in a single slot is 2 on a per component carrier basis.

For example, the PUSCH may carry user data and/or uplink control information (UCI) to the TRP, and the PUCCH may carry the UCI to the TRP.

According to some embodiments, the UE 101 may comprise an interface configured to enable the UE to communicate with two or more TRPs. Moreover, the UE 101 may further comprise a processor that may be configured to generate the UCI for each of the TRPs, schedule single or multiple uplink channels to carry the UCI, so that the UCI is transmitted individually or in combination to the TRPs via the interface, wherein the uplink channels may comprise NR PUCCH and/or NR PUSCH.

In an example, the interface of the UE may be the RF circuitry interface 316 of FIG. 3, which may be configured to send/receive data to/from the RF circuitry 206 of FIG. 2. In an example, the processor of the UE may be the central processing unit (CPU) 204E of FIG. 2 and FIG. 3.

The UCI may comprise one or more of scheduling request (SR), hybrid automatic repeat request (HARQ) acknowledgement/negative acknowledgement (ACK/NACK) feedback, channel state information (CSI) report (e.g., channel quality indicator (CQI)), pre-coding matrix indicator (PMI), CSI resource indicator (CRI), rank indicator (RI), beam related information (e.g., layer 1-reference signal received power (L1-RSRP)), and so on.

According to some embodiments, the UCI to be carried by the NR PUSCH or NR PUCCH may comprise the HARQ ACK/NACK feedback and/or the CSI report. In an example, the PUCCH may carry the HARQACK/NACK feedback for respective PDSCH(s) received from the TRP(s), while the PUSCH may carry the CQI report(s) to the TRP(s).

Figure 8:
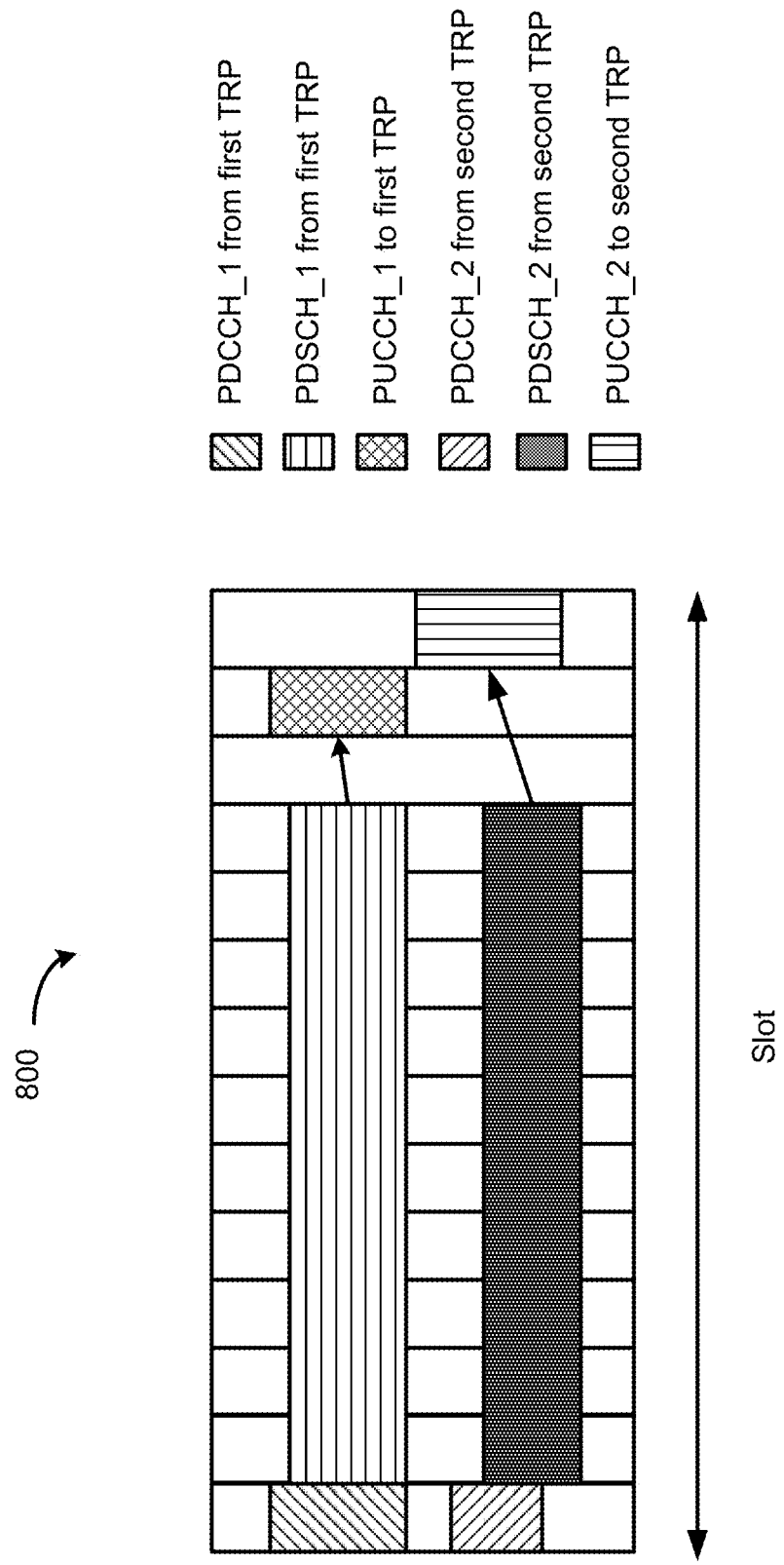
FIG. 8 illustrates an example of scheduling multiple uplink channels to carry uplink control information (UCI) in accordance with some embodiments.

FIG. 8 illustrates an example 800 of scheduling multiple uplink channels to carry UCI in accordance with some embodiments. In this example 800, the UE (e.g. UE 101) may simultaneously receive two DL signals from two TRPs, e.g. PDSCH_1 (or PDCCH_1) from the first TRP and PDSCH_2 (or PDCCH_2) from the second TRP. Accordingly, two PUCCHs are scheduled by the UE to separately carry the UCI for the first TRP and the UCI for the second TRP, and these PUCCHs are multiplexed in a time division multiplexing (TDM) manner, for example by occupying different symbols in the same slot, e.g. the second to last symbol and the last symbol as shown in FIG. 8.

As a specific example, the PUCCH_1 may carry the HARQ ACK/NACK feedback for the corresponding PDSCH_1 (from the first TRP) to the first TRP, while the PUCCH_2 may carry the HARQ ACK/NACK feedback for the corresponding PDSCH_2 (from the second TRP) to the second TRP. Alternatively, PUCCH_1 may carry the HARQ ACK/NACK feedback to the first TRP, while the PUCCH_2 may carry the CSI report to the second TRP.

It should be noted that any of the above discussed PUCCHs may be replaced with a PUSCH. It also should be noted that, although this example of FIG. 8 only shows the two PUCCHs, the UE may schedule more than two uplink channels, for example, two PUCCHs and one PUSCH, as described in details later with reference to FIG. 13 and FIG. 14. Moreover, the number of the TRPs is not limited to two.

Moreover, the processor (e.g. the CPU 204E) of the UE 101 may schedule the multiple uplink channels according to resource allocation in time domain, which may be configured by higher layers and/or dynamically configured by downlink control information (DCI) from the TRPs.

In an example, information regarding the resource allocation in time domain may be exchanged between the TRPs in a semi-static or dynamic manner, in order to implement coordination between the TRPs. Said information may comprise one or more of frame index, slot index, symbol index, starting symbol index and so on.

As one example, in case when there is certain coordination between different TRPs, the PUCCH and/or PUSCH carrying CSI reports for the different TRPs may be multiplexed in the TDM manner. This would allow the UE with single Tx beam or antenna port to transmit only one of PUCCH and/or PUSCH at a given time instance.

As another example, said information may indicate the position for transmission of each PUCCH carrying the HARQ ACK/NACK feedback for each corresponding PDSCH. For example, in case of short PUCCH with 1-symbol duration being used for transmission of the HARQACK/NACK feedback, different symbol index for each PUCCH may be configured by higher layers and/or dynamically indicated in the DCI from different TRPs.

Figure 9:
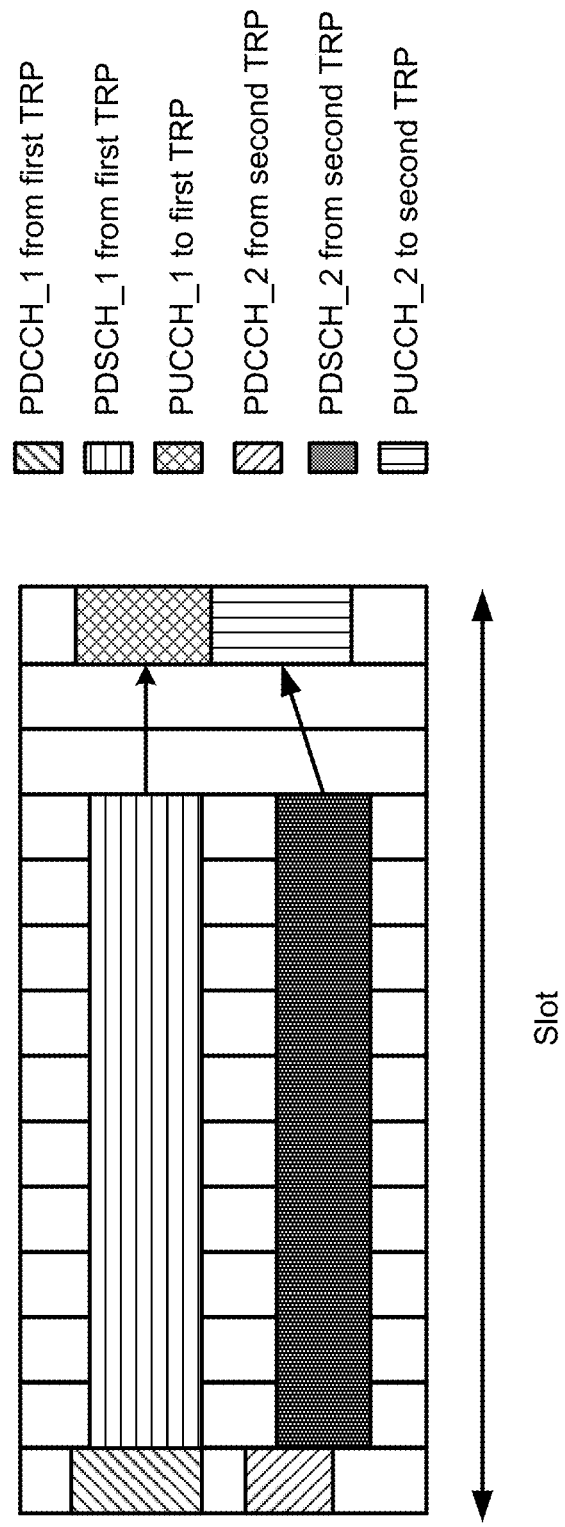
FIG. 9 illustrates another example of scheduling multiple uplink channels to carry UCI in accordance with some embodiments.

FIG. 9 illustrates another example 900 of scheduling multiple uplink channels to carry UCI in accordance with some embodiments. This example 900 is similar to the example 800 in FIG. 8, except that the two PUCCHs (i.e. PUCCH_1 and PUCCH_2) are multiplexed in a frequency division multiplexing (FDM) manner, e.g. occupying different frequency bands in one symbol.

Moreover, the processor (e.g. the CPU 204E) of the UE 101 may schedule the multiple uplink channels according to resource allocation in frequency domain, which may be configured by higher layers and/or dynamically configured by the DCI from the TRPs. Said resource allocation in frequency domain may be indicated by index of resource element (RE) or index of subcarrier, among others.

In an example, the resource allocation in frequency domain may be contiguous, based on semi-static or dynamic coordination between multiple TRPs. For example, as shown in FIG. 9, the PUCCH_1 and the PUCCH_2 may occupy two contiguous subcarriers, or in other words, some contiguous REs. Without the coordination between the TRPs, two PUCCHs multiplexed in the FDM manner may be mapped on some discontiguous REs, which may not be desirable due to increased inter-modulation distortion (IMD).

In case of the UE supporting only one transmit (Tx) beam or antenna port, transmission of two PUCCHs using two Tx beams simultaneously may not be feasible. The processor of the UE may select one of the two PUCCHs for transmission and drop the others, based on a dropping rule or priority rule, which may be predefined in 3GPP specification or configured by higher layers via NR minimum system information (MSI), NR remaining minimum system information (RMSI), NR other system information (OSI) or radio resource control (RRC) signaling. Alternatively, the UE may drop the PUCCH according to the channel quality of different BPL. For instance, the UE may transmit the PUCCH on the BPL with better channel condition and drop other PUCCHs. In an example, the UE may drop the PUCCH depending on specific implementation of the UE.

For carrier frequency below 6 GHz or above 6 GHz, if the UE employs omni-Tx beam for transmission of the PUCCHs and there is certain coordination between the multiple TRPs, the different TRPs may allocate the contiguous resources for the PUCCHs in the FDM manner. In this case, the UE may still be able to transmit multiple PUCCHs for a given time instance.

Figure 10:
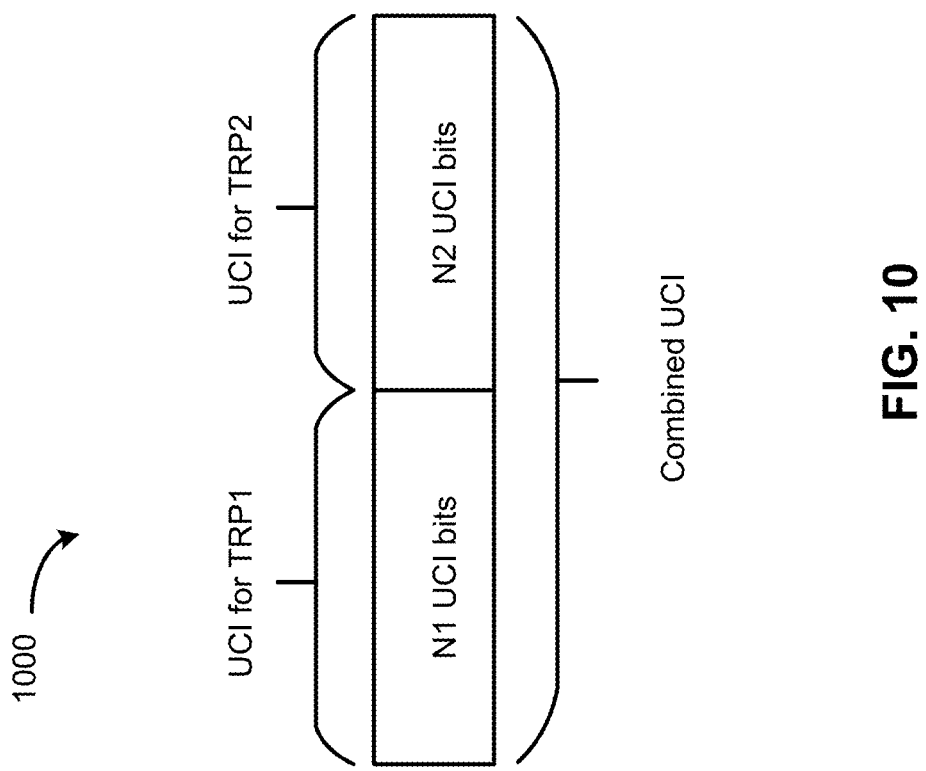
FIG. 10 illustrates an example of combined UCI for multiple TRPs in accordance with some embodiments.

FIG. 10 illustrates an example 1000 of combined UCI for multiple TRPs in accordance with some embodiments. As mentioned before, a UE may comprise an interface (e.g. the RF circuitry interface 316 of FIG. 3 being configured to send/receive data to/from the RF circuitry 206 of FIG. 2) to enable the UE to communicate with multiple TRPs. In this case, the processor (e.g. the CPU 204E) of the UE (e.g. UE 101) may generate individual UCI for each of the multiple TRPs, and then combine the UCI generated for each TRP into the combined UCI.

In accordance with some embodiments, the combined UCI may be encoded in a form of bit set, wherein each individual UCI for one of the TRPs may correspond to a subset of said bit set. For example, the UCI generated for the TRP1 may be encoded as the first subset having N1 bits, and the UCI generated for the TRP2 may be encoded as the second subset having N2 bits, wherein both N1 and N2 are positive integer (e.g., 1, 2, . . . ). In other embodiments, the combined UCI may be encoded into other data structure than that shown in FIG. 10.

It should be noted that, a number of bits in each subset (such as N1, N2) may be configured by higher layers and/or indicated by downlink control information (DCI) from the TRPs.

In some embodiments, the UE may combine HARQ ACK/NACK feedback for the corresponding PDSCHs from different TRPs and transmit the combined HARQ ACK/NACK feedback on a PUCCH. In one example, if single codeword is used for each PDSCH, 1-bit HARQ ACK/NACK feedback may be fed back for each PDSCH. It means that N1=1 and N2=1, and the total number of bits (i.e. N1+N2) for the combined HARQ ACK/NACK feedback is 2, in case of two TRPs. In another example, if two codewords are used for each PDSCH, 2-bit HARQACK/NACK feedback may be fed back for each PDSCH, which means that N1=2 and N2=2, and the total number of bits (i.e. N1+N2) for the combined feedback is 4 in case of two TRPs. In yet another example, if transmission is based on code block group (CBG), the specific values of N1 and N2 may be configured by higher layers.

In some embodiments, the UE may combine the CSI reports for different TRPs, and transmit the combined CSI report on a PUSCH or a PUCCH.

In some embodiments, TRP index for said bit set is predefined in 3GPP technical specification or configured by higher layers, e.g. via RRC signaling.

In some embodiments, resource index may be explicitly signaled in the DCI for downlink assignment, in order to indicate the resource allocation for PUCCH transmission for HARQ ACK/NACK feedback and aperiodic CSI report. In case of discontinuous transmission (DTX), no matter whether the downlink assignment for data channel for a TRP has been decoded correctly or not, the UE may reserve a fixed number of bits for a combined HARQACK/NACK feedback with a pre-defined value, e.g. all zeros. As a result, the gNB may readily identify the payload size of the PUCCH. The TRP index (or indexes) where ACK/NACK for the PDSCH may be reported can be dynamically indicated by the DCI. Alternatively, the UE may only feedback the HARQ-ACK for the configured TRP where the downlink assignment has been decoded correctly. Moreover, said bit set may only include the UCI bits intended for the TRPs for which the corresponding HARQ-ACK feedback is generated. In this case, the gNB may use blind detection to detect possible payload size of the PUCCH.

Figure 11:
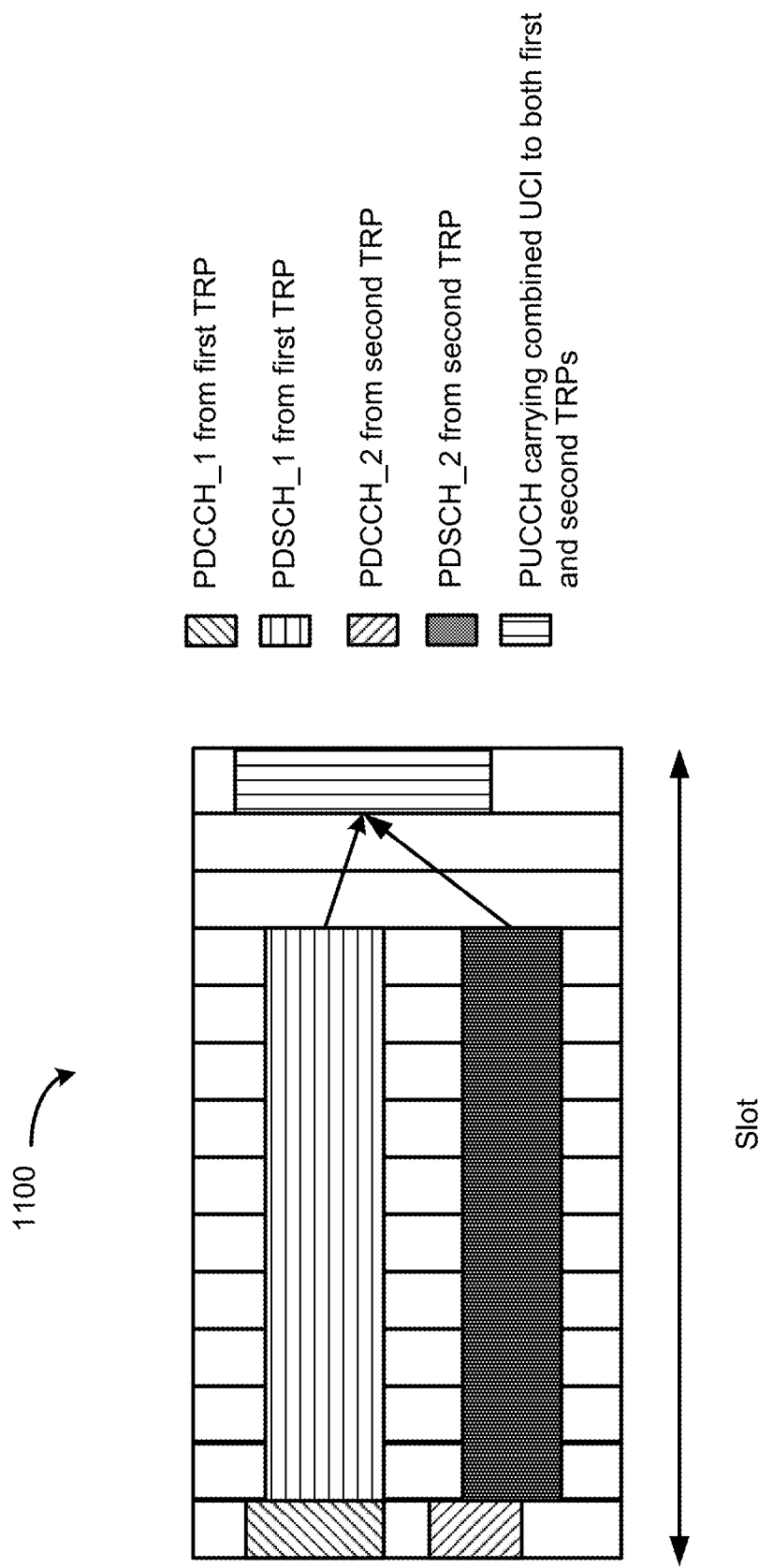
FIG. 11 illustrates an example of scheduling single uplink channel to carry the combined UCI for multiple TRPs in accordance with some embodiments.

FIG. 11 illustrates an example 1100 of scheduling single uplink channel to carry the combined UCI for multiple TRPs in accordance with some embodiments. After having generated the combined UCI (e.g. the bit set of FIG. 10), the processor (e.g. the CPU 204E) of the UE (e.g. UE 101) may schedule the single uplink channel, e.g. one PUCCH as shown in FIG. 11, to carry the combined UCI. With the aid of the RF circuitry interface 316 of FIG. 3 and the RF circuitry 206 of FIG. 2, the UE 101 may transmit the combined UCI over the scheduled PUCCH to the TRPs.

As one example (e.g. as shown in FIG. 11), the combined UCI may be transmitted over the scheduled PUCCH simultaneously to each of the TRPs, for example, to both TRP1 701 and TRP2 702, if the UE 101 supports multiple transmit (Tx) beams or antenna ports (APs) for UL transmission.

As another example, the combined UCI may be transmitted over the scheduled PUCCH to one of the TRPs (e.g. TRP1 701) which may then forward the combined UCI to the remaining TRPs (e.g. TRP2 702). The forwarding operation may be performed with the aid of some tight coordination between the multiple TRPs, e.g., via ideal backhaul.

For example, the UE may transmit a combined HARQ ACK/NACK feedback for the corresponding PDSCHs (e.g. PDSCH_1 and PDSCH_2) from multiple TRPs over one PUCCH. In case of the UE supporting only one Tx beam or antenna port, the UE may perform beam sweeping on the PUCCH carrying the combined HARQ ACK/NACK feedback to the multiple TRPs.

For example, the UE may transmit a combined CSI report to all of the TRPs. If the UE supports only one Tx beam or antenna port, the UE may perform beam sweeping for the transmission of the combined CSI report on a PUCCH or a PUSCH.

Figure 12:
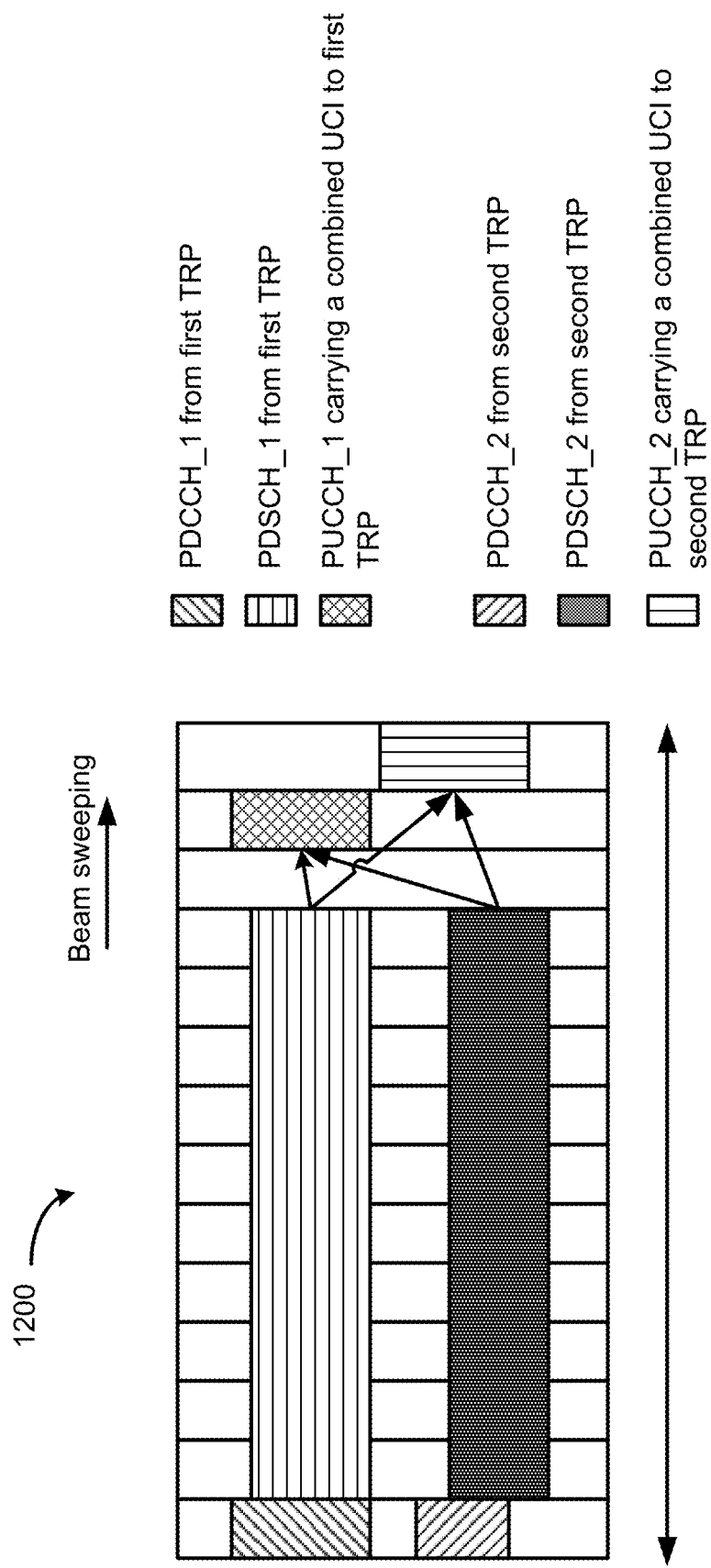
FIG. 12 illustrates an example of scheduling multiple uplink channels to carry combined UCI for multiple TRPs in accordance with some embodiments.

FIG. 12 illustrates an example 1200 of scheduling multiple uplink channels to carry combined UCI for multiple TRPs in accordance with some embodiments. After having generated the combined UCI (e.g. the bit set of FIG. 10), the processor (e.g. the CPU 204E) of the UE (e.g. UE 101) may schedule more than one uplink channels, e.g. PUCCH_1 and PUCCH_2 each carrying the combined UCI, as shown in FIG. 12.

As one example, the combined UCI may be transmitted over the two PUCCHs (e.g. PUCCH_1 and PUCCH_2) to the two TRPs (e.g. TRP1 701 and TRP2 702), if the UE 101 supports multiple transmit (Tx) beams or antenna ports (APs) for UL transmission. Moreover, the two PUCCHs may be multiplexed in the TDM or FDM manner in case of the UE supporting two Tx beams or APs.

As another example, the combined UCI may be transmitted to each of the TRPs by means of beam sweeping if the UE supports only one Tx beam or antenna port.

In an example, the payload size of the combined UCI (e.g. the combined HARQACK/NACK feedback) can be large. In case of scheduling a PUCCH to carry said combined UCI, the processor of the UE 101 may be configured to dynamically select a format of the PUCCH according to the payload size, or in other words, the total number of bits in said bit set of FIG. 10.

In an example, the dynamical selection of the PUCCH is based on downlink control information (DCI) from the TRPs. Moreover, a field in the DCI may be used to indicate the resource for PUCCH transmission from a set of resource for the new PUCCH formats configured by higher layers.

For example, the technical specification 3GPP TS 38.211 version 15.2.0 Release 15 ("Physical channels and modulation") has defined the new radio (NR) PUCCH formats in the table 6.3.2.1-1 as below:

TABLE 6.3.2.1-1

PUCCH formats.

| PUCCH format | Length in OFDM symbols $N_{symb}^{PUCCH}$ | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 | where $N_{symb}^{PUCCH}$ is the length of the PUCCH transmission in OFDM symbols.

Figure 13:
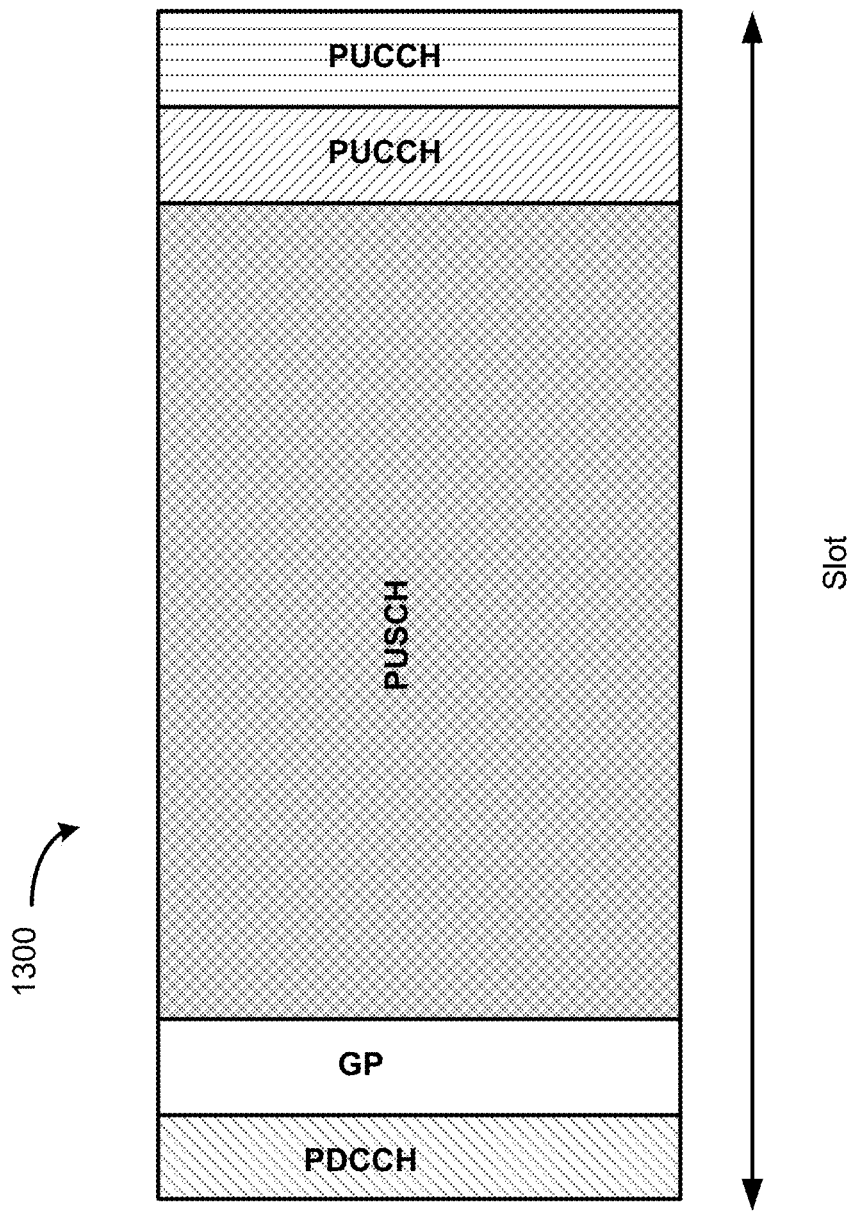
FIG. 13 illustrates one example for the scheduled uplink channels in accordance with some embodiments.
Figure 14:
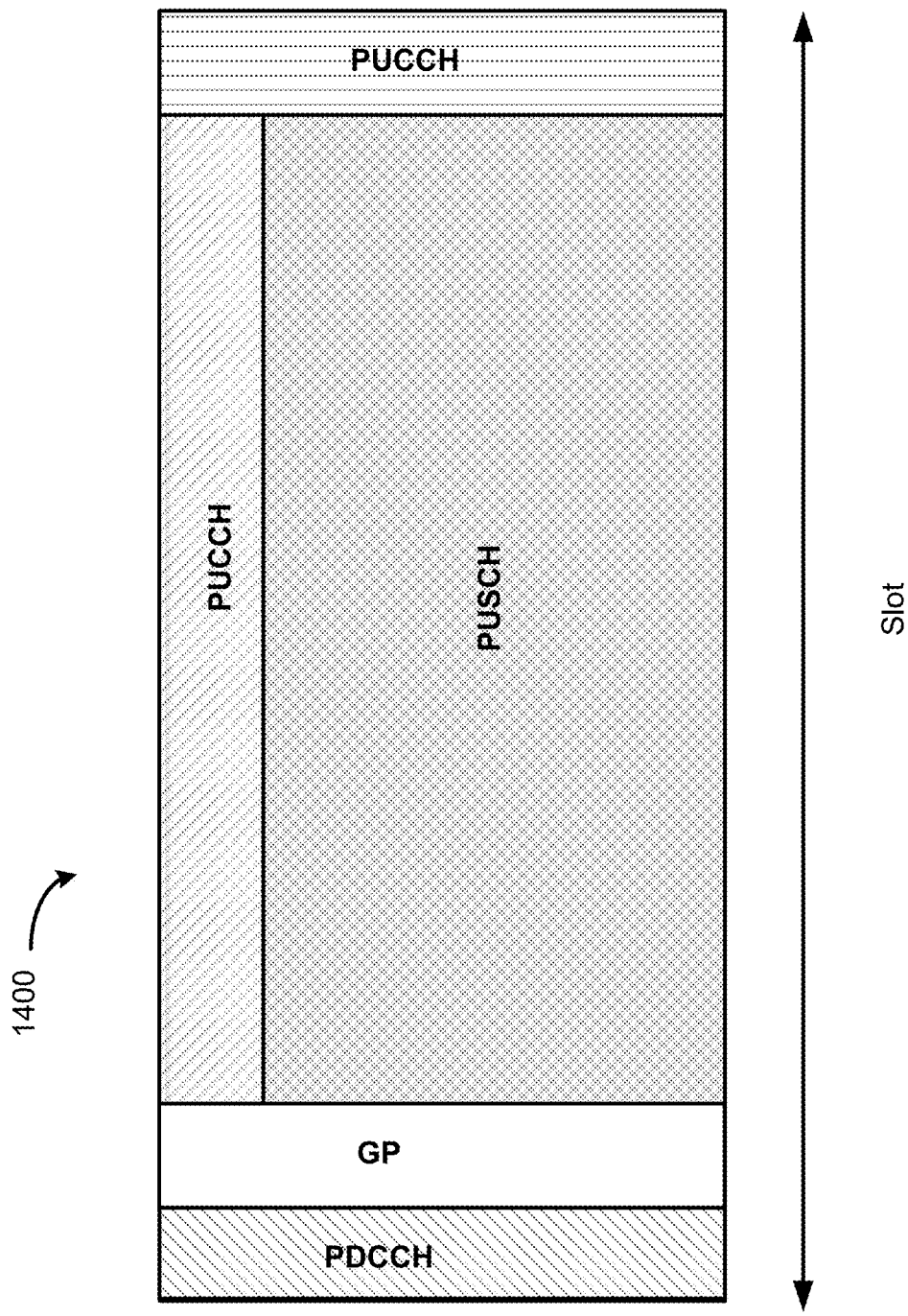
FIG. 14 illustrates another example for the scheduled uplink channels in accordance with some embodiments.

FIG. 13 and FIG. 14 illustrate two examples 1300 and 1400 for the scheduled uplink channels in accordance with some embodiments. In the example 1300, the scheduled uplink channels may include one PUSCH and two short PUCCHs. In the example 1400, the scheduled uplink channels may include one PUSCH, one long PUCCH and one short PUCCH. In other examples, the scheduled uplink channels may include more or less uplink channels than those in the example 1300 or 1400, for example, scheduling one PUSCH plus one PUCCH, or scheduling two short PUCCHs only.

In some embodiments, the term "short PUCCH" may refer to the PUCCH having format 2 in the above table 6.3.2.1-1. In other embodiments, the term "short PUCCH" may refer to the PUCCH having format 0 in the above table 6.3.2.1-1.

In some embodiments, said long PUCCH may be the PUCCH having format 1, format 3 or format 4.

Figure 15:
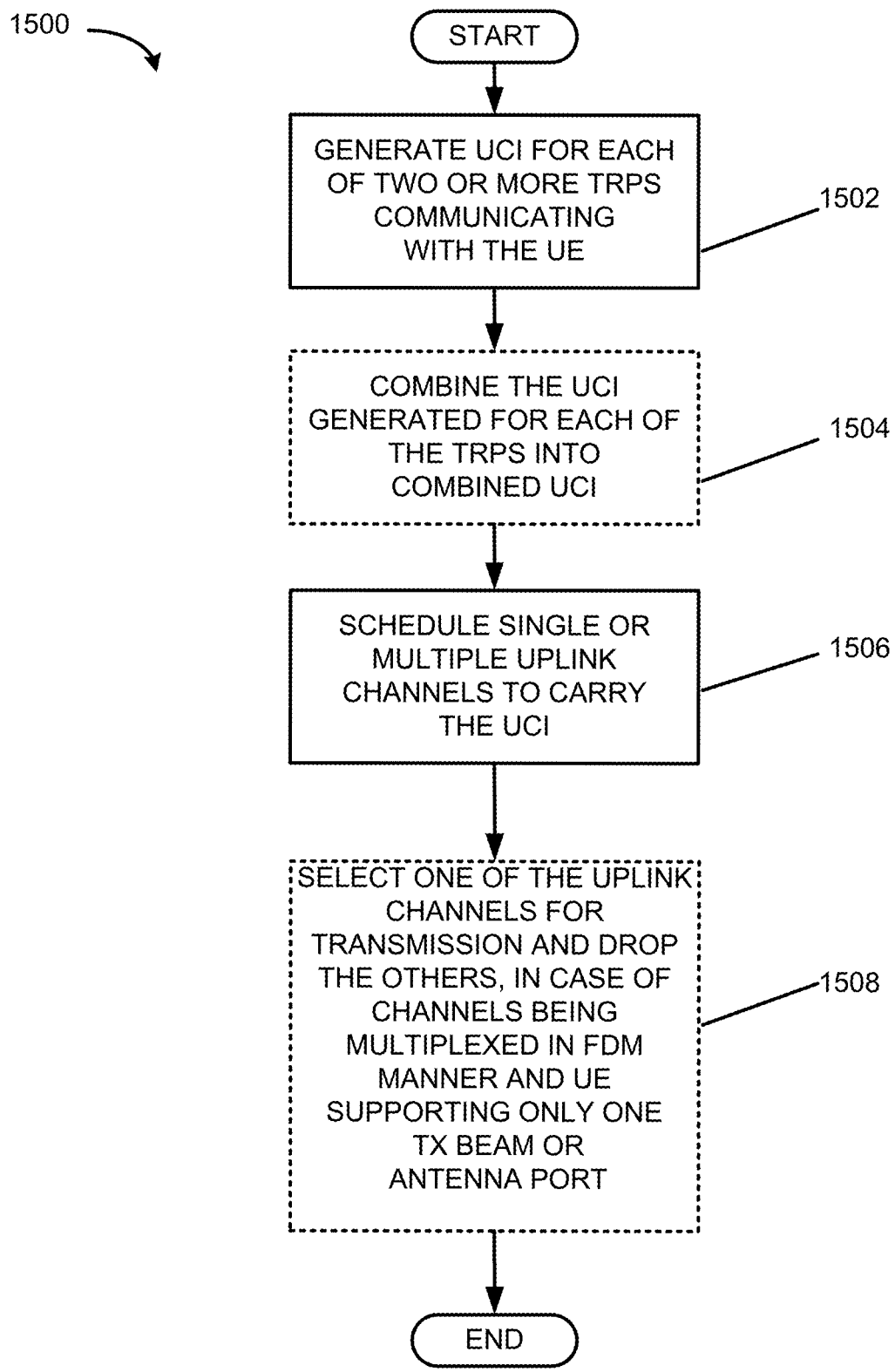
FIG. 15 is a flowchart illustrating an example method employable at a UE to facilitate multi-TRP operation in accordance with some embodiments.

FIG. 15 is a flowchart illustrating an example method 1500 employable at a UE to facilitate multi-TRP operation in accordance with some embodiments.

In accordance with some embodiments, a machine readable medium may store instructions associated with the method 1500 that, when executed, may cause a UE to perform the steps of the method 1500.

At step 1502, the UE may generate uplink control information (UCI) for each of two or more TRPs communicating with the UE.

At step 1506, the UE may schedule single or multiple uplink channels to carry the UCI, so that the UCI may be transmitted over the scheduled uplink channels individually or in combination to the TRPs, via an interface (e.g., the RF circuitry interface 316 of FIG. 3 to send/receive data to/from RF circuitry 206 of FIG. 2), wherein the uplink channels may comprise new radio (NR) physical uplink control channel (PUCCH) and/or NR physical uplink shared channel (PUSCH).

In an embodiment, the UCI generated at step 1502 may comprise hybrid automatic repeat request (HARQ) acknowledgement/negative acknowledgement (ACK/NACK) feedback and/or channel state information (CSI) report.

In an embodiment, at step 1506, the UE may schedule the multiple uplink channels each carrying the UCI generated for one of the TRPs, wherein the multiple uplink channels may be multiplexed in a time division multiplexing (TDM) manner, or in a frequency division multiplexing (FDM) manner.

In an embodiment, at step 1506, the UE may schedule the multiple uplink channels according to resource allocation in time domain or in frequency domain, which may be configured by higher layers and/or dynamically configured by downlink control information (DCI) from the TRPs.

As an example, the information regarding the resource allocation in time domain may be exchanged between the TRPs in a semi-static or dynamic manner. As another example, the resource allocation in frequency domain may be contiguous, based on semi-static or dynamic coordination between the TRPs.

In an embodiment, if the scheduled uplink channels are multiplexed in the FDM manner, the method 1500 may comprise a further step 1508, at which the UE may select one of the multiple uplink channels for transmission and drop the others, in case of the UE supporting only one transmit (Tx) beam or antenna port.

As an example, the dropping may be based on a dropping rule or priority rule, which may be predefined in 3GPP specification or configured by higher layers. As another example, the dropping may be based on channel quality of the uplink channels.

In an embodiment, the method 1500 may comprise an optional step 1504 after step 1502 and before step 1506. At step 1504, the UE may combine the UCI generated for each of the TRPs into a bit set, wherein each UCI corresponds to a subset of said bit set. In an example, a number of bits in each subset may be configured by higher layers and/or indicated by downlink control information (DCI) from the TRPs. And then, at step 1506, the UE may schedule the single uplink channel to carry said bit set.

In an example, said bit set may be transmitted to one of the TRPs which may forward said bit set to the remaining TRPs. In another example, said bit set may be transmitted simultaneously to each of the TRPs in case of the UE supporting multiple transmit (Tx) beams.

In an embodiment, after having combined the UCI generated for each of the TRPs into the bit set at step 1504, the UE may schedule the multiple uplink channels each carrying said bit set at step 1506. According to the scheduling, said bit set may be transmitted simultaneously to each of the TRPs if the UE supports multiple transmit (Tx) beams, or said bit set may be transmitted to each of the TRPs by means of beam sweeping if the UE only supports single Tx beam.

In an embodiment, TRP index for said bit set may be predefined in 3GPP technical specification or configured by higher layers.

In an embodiment, said bit set may only include the UCI generated for the TRPs for the corresponding HARQ-ACK feedback.

In an embodiment, in case of scheduling a PUCCH to carry said bit set, the method 1500 may further comprise an optional step of dynamically selecting a format of the PUCCH based on downlink control information (DCI) from the TRPs, according to a number of bits in said bit set.

Figure 16:
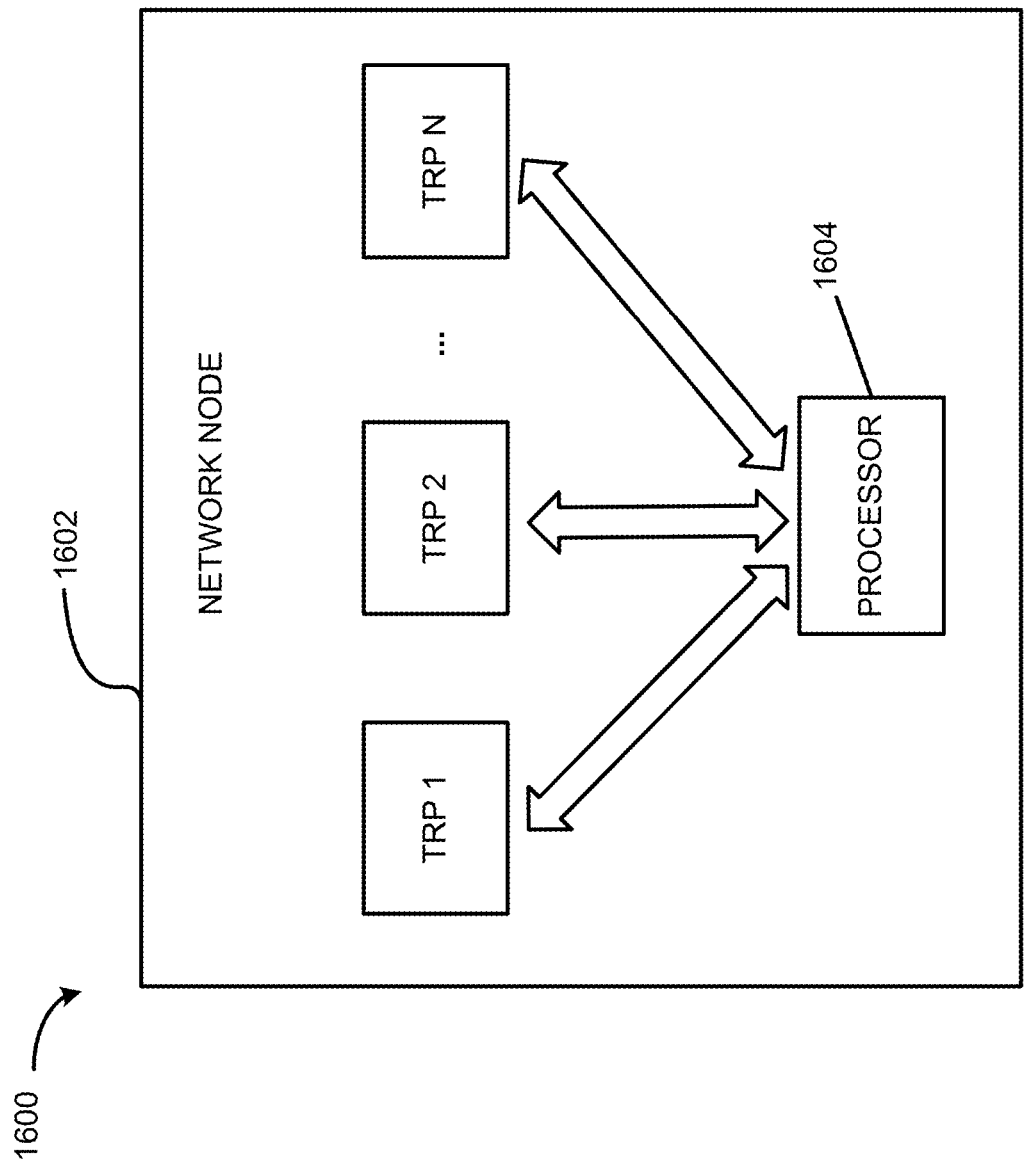
FIG. 16 is a block diagram illustrating an example of a network node for facilitating the multi-TRP operation in accordance with some embodiments.

FIG. 16 is a block diagram illustrating an example of a network node for facilitating the multi-TRP operation in accordance with some embodiments.

In an embodiment, the network node 1602 may have two or more TRPs (e.g. TRP1, TRP2, . . . TRPN). At least two of the TRPs or all of the TRPs in the network node 1602, together with a UE, may implement the various embodiments of multi-TRP operation, as discussed with reference to any of FIGS. 7 to 15.

In an embodiment, the network node 1602 may comprise a processor 1604 which may be configured to: enable the two or more TRPs to communicate with a UE and to receive a bit set via single or multiple uplink channels, said bit set including multiple subsets each corresponding to uplink control information (UCI) for one of the TRPs; coordinate between the two or more TRPs; and generate downlink control information (DCI) for the UE, wherein the uplink channels may comprise NR PUCCH and/or NR PUSCH.

In an embodiment, said DCI may comprise one or more of the followings:
  information indicating resource allocation in time domain for the uplink channels;
  information indicating resource allocation in frequency domain for the uplink channels;
  information indicating a number of bits in each of the multiple subsets; and
  information indicating a format of the PUCCH carrying the bit set.

In accordance with some embodiments, the network node may be radio access network (RAN) node, e.g. macro RAN node 111 shown in FIG. 1, which may also be referred to as a base station (BS), NodeB (NB), evolved NodeB (eNB), next Generation NodeB (gNB), and so forth.

In the example 1600, the TRPs may be several transceivers or remote headends (RHs) located at a base station, and may be coordinated by the processor 1604. The processor 1604 may act as a central coordinator, which may communicate with each of the TRPs to coordinate between different TRPs.

In another example, the TRPs may be located in several different networks nodes. For example, TRP1 may be part of one base station, while TRP2 may be part of another base station. In this case, said TRP1 and TRP2 are controlled or coordinated by their respective base station controllers (BSCs) and/or a controller or coordinator at a higher level. For example, the coordination between the TRPs may be performed via an ideal backhaul (e.g. optical fiber).

For fifth generation (5G) or new radio (NR) communication system, various formats have been defined for physical uplink control channel (PUCCH) to meet the diverse requirements for different types of traffic. For example, the technical specification 3GPP TS 38.211 version 15.2.0 Release 15 has defined the new radio (NR) PUCCH formats in the table 6.3.2.1-1 as mentioned above.

Figure 17:
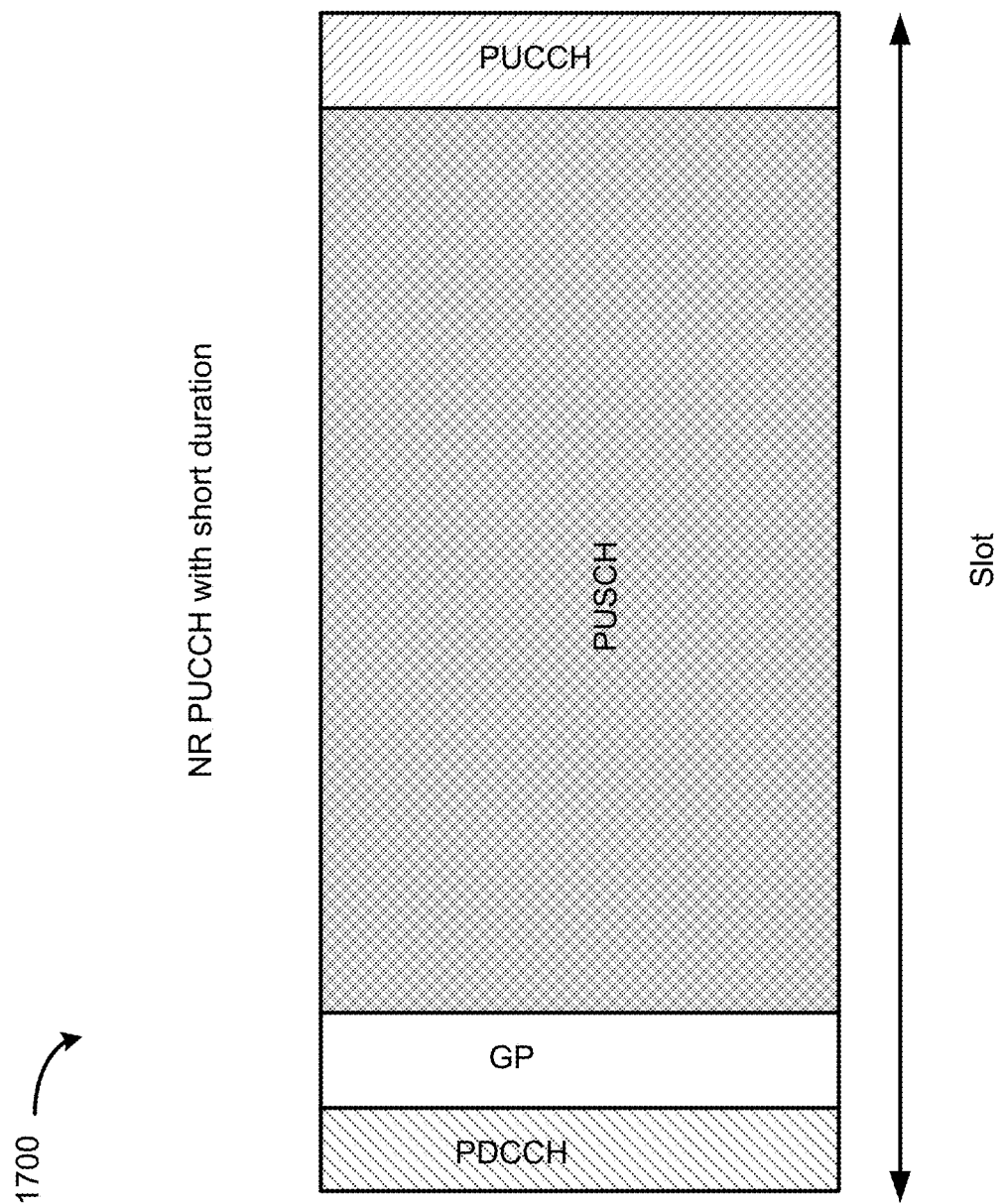
FIG. 17 is a diagram illustrating an example 1700 of a short NR PUCCH in accordance with some embodiments.

FIG. 17 is a diagram illustrating an example 1700 of a short NR PUCCH in accordance with some embodiments. The short NR PUCCH may have a relatively short duration within an uplink (UL) slot. For example, the short NR PUCCH may have format 0 or format 2 with the duration of one or two OFDM symbols, as defined in the aforesaid table 6.3.2.1-1.

In the example 1700, the short NR PUCCH and a NR physical uplink shared channel (NR PUSCH) may be multiplexed in a time division multiplexing (TDM) manner, which can be targeted for some applications with low-latency requirement.

In another example, two short NR PUCCHs and one NR PUSCH may be multiplexed in the TDM manner.

Moreover, in order to accommodate the time for switching from downlink (DL) to uplink (UL) and from UL to DL and round-trip propagation delay, a guard period (GP) may be inserted between a NR physical downlink control channel (NR PDCCH) and the NR PUSCH.

Figure 18:
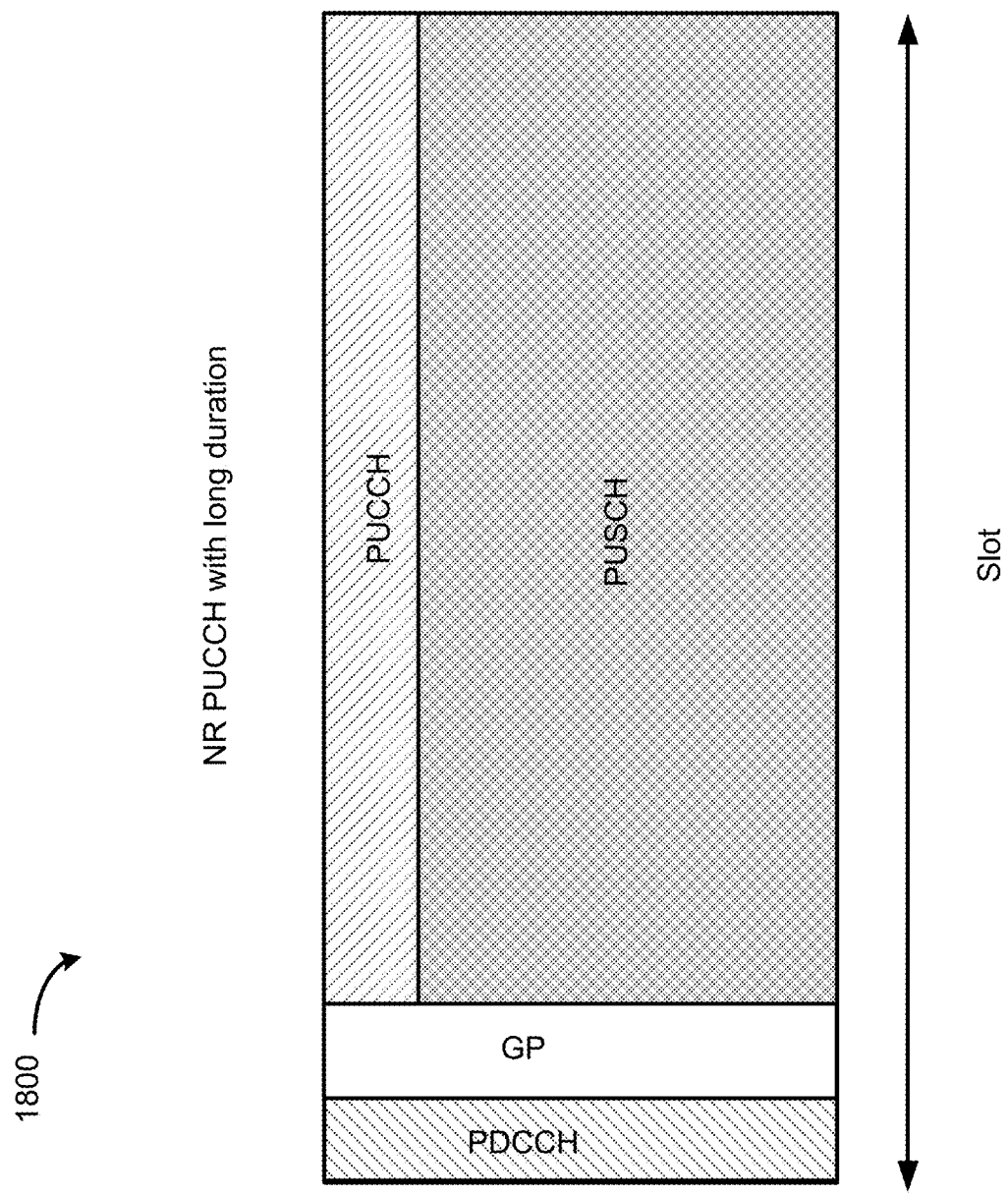
FIG. 18 is a diagram illustrating an example 1800 of a long NR PUCCH in accordance with some embodiments.

FIG. 18 is a diagram illustrating an example 1800 of a long NR PUCCH in accordance with some embodiments. The long NR PUCCH may have a relatively long duration within the UL slot. For example, the long NR PUCCH may have format 1, format 3 or format 4 with the duration of 4-14 OFDM symbols (i.e. spanning any number of symbols from 4 to 14 within a slot), as defined in the aforesaid table 6.3.2.1-1.

In the example 1800, the long NR PUCCH and a NR PUSCH may be multiplexed in a frequency division multiplexing (FDM) manner. Moreover, more OFDM symbols than those used for the short NR PUCCH can be allocated for the long NR PUCCH, in order to improve link budget and uplink coverage for control channel.

Similarly, in view of the switching time and the round-trip propagation delay, the GP may be inserted between the NR PDCCH and the NR PUCCH, NR PUSCH.

In accordance with some embodiments, the short NR PUCCH and the long NR PUCCH may carry uplink control information (UCI). The UCI may comprise one or more of scheduling request (SR), hybrid automatic repeat request (HARQ) acknowledgement/negative acknowledgement (ACK/NACK) feedback, channel state information (CSI) report (e.g., channel quality indicator (CQI)), pre-coding matrix indicator (PMI), CSI resource indicator (CRI), rank indicator (RI), beam related information (e.g., layer 1-reference signal received power (L1-RSRP)), and so on.

In an example, for a given UE (e.g. UE 101 or UE 102), one short NR PUCCH and one long NR PUCCH can be multiplexed in the TDM manner in the same slot (e.g. as shown in FIG. 14). They may be used for different types of traffic having different requirements. For example, the short PUCCH may carry the HARQ ACK/NACK feedback being time-critical, while the long PUCCH may carry the CSI report having a relatively large payload size.

In accordance with some embodiments, demodulation reference signal (DM-RS) generated by a UE may be used by a network node (e.g. gNB, or TRP) for channel estimation, coherent demodulation of the received data and so on. Use of a properly designed DM-RS may substantially enhance the performance of a wireless communication system. Embodiments described hereinafter may be directed to detailed DM-RS design for a short NR PUCCH with more than 2 bits UCI.

Figure 19:
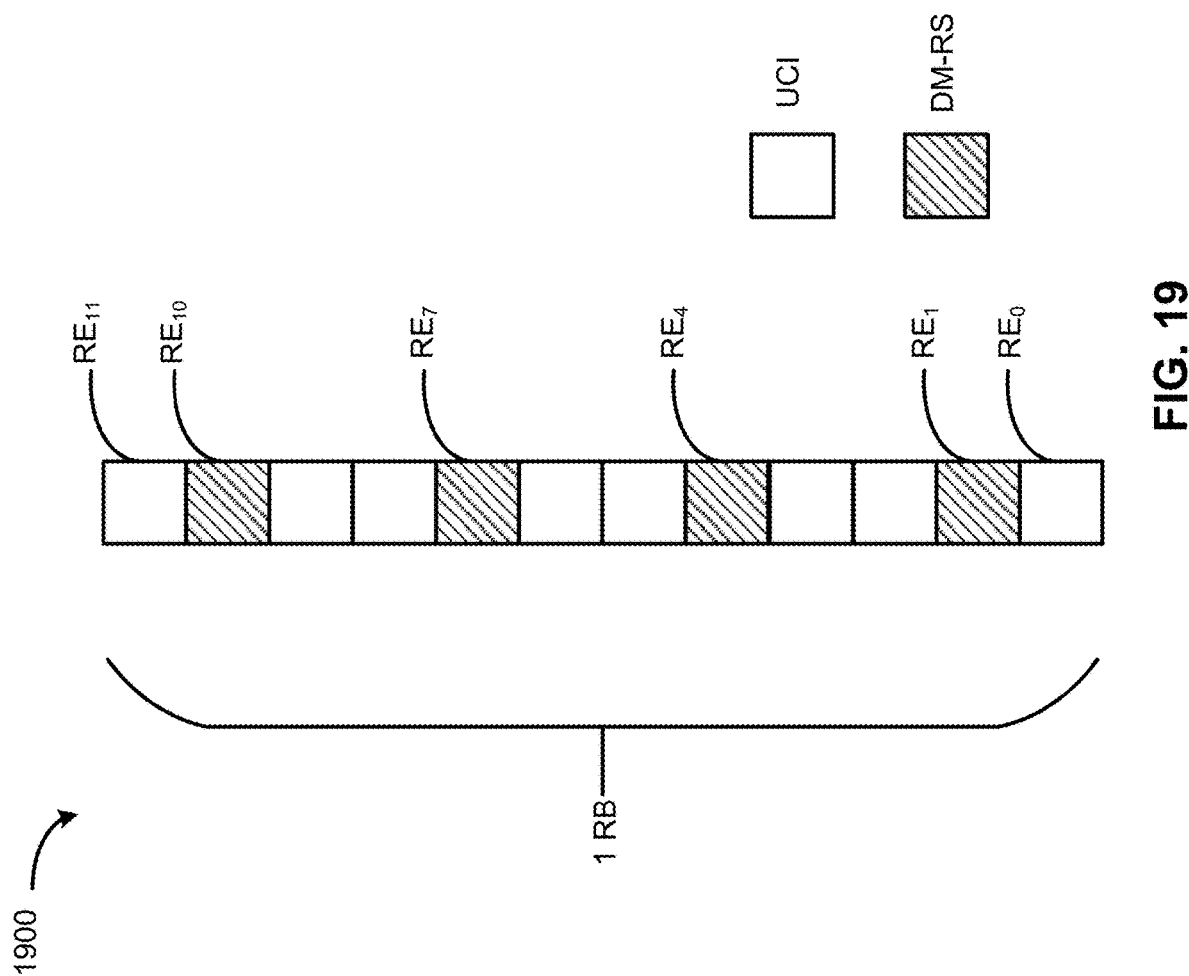
FIG. 19 is a diagram illustrating an example 1900 of a demodulation reference signal (DM-RS) pattern for a short NR PUCCH with more than 2 bits UCI in accordance with some embodiments.

FIG. 19 is a diagram illustrating an example 1900 of a DM-RS pattern for a short NR PUCCH with more than 2 bits UCI in accordance with some embodiments. For example, the short NR PUCCH with more than 2 bits UCI may refer to the NR PUCCH having format 2 in the aforesaid table 6.3.2.1-1. Moreover, one short NR PUCCH may span one or two symbols.

As shown in the example 1900, the short NR PUCCH may span one symbol corresponding to one resource block (RB). A given RB may have 12 resource elements (REs), wherein an index of a RE may be an integer ranging from 0 to 11, i.e. $RE_0$, $RE_1$ ... $RE_{11}$. For this short NR PUCCH carrying more than 2 bits UCI, the DM-RS and the UCI may be multiplexed on the NR PUCCH in the FDM manner. As an example, the DM-RS may be mapped on four REs (e.g. $RE_1$, $RE_4$, $RE_7$, $RE_{10}$), while the UCI may be mapped on any of the remaining REs.

In accordance with some embodiments, a pseudo noise (PN) sequence may be used to generate the DM-RS.

In an example, the PN sequence as used for PUSCH may be used for DM-RS for the short NR PUCCH with more than 2 bits UCI.

Figure 20:
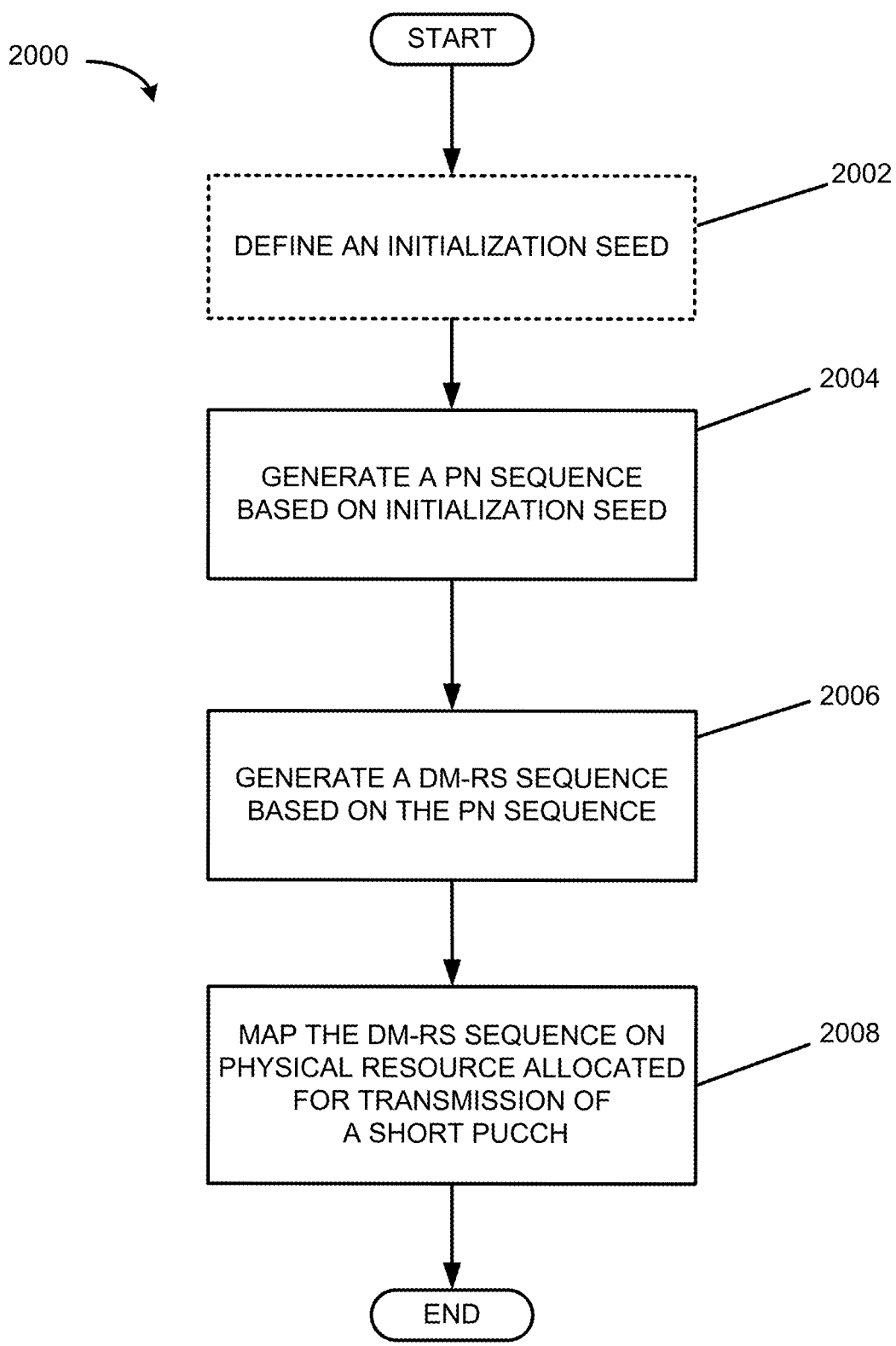
FIG. 20 is a flowchart illustrating an example method 2000 employable at a UE to facilitate generating a DM-RS pattern in accordance with some embodiments.

FIG. 20 is a flowchart illustrating an example method 2000 employable at a UE to facilitate generating a DM-RS pattern in accordance with some embodiments. The method may be accomplished by the UE 101 or the UE 102 in FIG. 1, in particular, by one or more processors (e.g. the CPU 204E of FIG. 2 or FIG. 3), and optionally the memory 204G of FIG. 2 or FIG. 3.

At step 2004, the UE may generate a PN sequence based on an initialization seed. At step 2006, the UE may generate a DM-RS sequence based on the PN sequence generated at step 2004. And then, at step 2008, the UE may map the DM-RS sequence on physical resource allocated for transmission of a short NR PUCCH with more than 2 bits UCI.

In accordance with some embodiments, the method 2000 may further comprise a step 2002 of defining an initialization seed as a function of one or more of the following parameters:

- slot index or mini-slot index for transmission of the short NR PUCCH;
- symbol index or starting symbol index for transmission of the short NR PUCCH;
- scrambling identity (ID), or physical cell ID when the scrambling ID is not available;
- beam ID; and
- UE-specific parameter.

The UE-specific parameter may include, but not be limited to, a bandwidth part (BWP) ID, an offset parameter, or a UE ID including a cell radio network temporary identifier (C-RNTI) of the UE.

As one example, the scrambling ID may be configured by higher layers via NR minimum system information (MSI), NR remaining minimum system information (RMSI), NR other system information (OSI), radio resource control (RRC) signaling, or the like.

As another example, the scrambling ID may be dynamically indicated by downlink control information (DCI) from a network node (e.g. gNB or TRP).

As still another example, in uplink power control, there can be multiple sets of {P0, alpha}, depending on traffic types or beam pair links or waveforms. The scrambling ID may be configured based on an index of a set of {P0, alpha} for uplink power control and/or pathloss.

Moreover, the scrambling ID may be configured independently for different bandwidth parts (BWPs) being configured or being active within a system bandwidth. Alternatively or in addition, the scrambling ID may be configured independently for different types of the UCI. For example, the scrambling ID with a value of 0 may be selected for the HARQ ACK/NACK feedback, while the scrambling ID with a value of 1 may be selected for the CSI report.

If the UCI carried by the short NR PUCCH is the HARQ ACK/NACK feedback for a corresponding PDSCH from a network node, the scrambling ID used for transmission of the DM-RS sequence on the short NR PUCCH may be the same as that for transmission of the DM-RS sequence on the PDSCH. Alternatively, the scrambling ID may be dynamically switched according to the DCI from the network node. For example, a 1-bit indicator in the DCI may be used to dynamically switch between two configured scrambling IDs.

If the UCI carried by the short NR PUCCH is a CSI report, the scrambling ID used for transmission of the DM-RS sequence on the short NR PUCCH may be configured by higher layers via UE-specific RRC signaling. In case when the configured value is not available, the scrambling ID may be equal to a physical cell ID.

In some embodiments, the initialization seed may be defined at step 2002 in accordance with the following function:

$$c_{init} = (14 \cdot (n_s+1) + l + 1) \cdot (2 \cdot n_{ID,m}^{PUCCH} + 1) \cdot c_0 + c_1$$

where:

$c_0$, $c_1$ are constants, e.g., $c_0 = 2^{16}$ and $c_1 = 2$, which may be predefined in the 3GPP technical specification;

$n_s$ is the slot index for transmission of the short NR PUCCH;

l is the symbol index or starting symbol index for transmission of the short NR PUCCH; and $n_{ID,m}^{PUCCH}$ is the $m^{th}$ scrambling ID for transmission of the short NR PUCCH.

It is to be noted that m may be configured by higher layers or dynamically indicated in the DCI for scheduling of PDSCH, or a combination thereof. In an example, $n_{ID,m}^{PUCCH} = 0$ or $n_{ID,m}^{PUCCH} = 1$, which may be configured by higher layers.

In another example, when the value of $n_{ID,m}^{PUCCH}$ is not configured by higher layers, $n_{ID,m}^{PUCCH} = n_{ID}^{cell}$ (i.e. cell ID), or $n_{ID,m}^{PUCCH} = f(n_{ID}^{cell}, m)$ wherein the function f( ) may be predefined in the technical specification.

In case of the short NR PUCCH spanning two symbols, the PN sequence for transmission of DM-RS on the short NR PUCCH may be independently generated for each symbol, e.g., by mean of including a symbol index "l" as a variable in the process for generating the PN sequence. As an example, the initialization seed may be defined independently for each symbol based on its respective symbol index. Accordingly, the above function for generating initialization seed may be rewritten as:

$$c_{init}(l) = (14 \cdot (n_s+1) + l + 1) \cdot (2 \cdot n_{ID,m}^{PUCCH} + 1) \cdot c_0 + c_1$$

In some embodiments, the initialization seed may be defined at step 2002 in accordance with the following function:

$$c_{init} = (14 \cdot (n_s+1) + l + 1) \cdot (2 \cdot n_{ID}^{nSCID} + 1) \cdot c_0 + n_{ID}^{nSCID}$$

where:

$c_0$ is constant, e.g., $c_0 = 2^{16}$, which may be predefined in the 3GPP technical specification;

$n_s$ is the slot index for transmission of the short NR PUCCH;

l is the symbol index or starting symbol index for transmission of the short NR PUCCH; and $n_{ID}^{nSCID}$ may be configured by higher layers or dynamically indicated in the DCI for scheduling of PDSCH, for example, $n_{ID}^{nSCID} = 0$ or 1.

In some embodiments, the initialization seed may be defined at step 2002 in accordance with the following function:

$$c_{init} = (n_s+1) \cdot (2 \cdot n_{ID,m}^{PUCCH}+1) \cdot c_0 + n_{RNTI}$$

where:

$c_0$ is constant, e.g., $c_0 = 2^{16}$, which may be predefined in the 3GPP technical specification;

$n_s$ is the slot index for transmission of the short NR PUCCH;

$n_{ID,m}^{PUCCH}$ is the $m^{th}$ scrambling ID for transmission of the short NR PUCCH; and $n_{RNTI}$ is the C-RNTI for a given UE, which may be referred to as temporary C-RNTI (TC-RNTI) before the UE obtains a C-RNTI, in case of the short NR PUCCH carrying HARQ-ACK/NACK feedback for Msg. 4 transmission in random access channel (RACH) procedure.

After having defined the initialization seed according to any of the above embodiments or obtained the initialization seed by other approaches (e.g. directly retrieving an initialization seed from a memory or storage device), the UE may initialize a PN sequence generator with the initialization seed to generate the PN sequence (at step 2004).

In an example, the UE may generate the same PN sequence for the DM-RS sequence on the short NR PUCCH and on a PUSCH with cyclic prefix-orthogonal frequency division multiplexing (CP-OFDM) based waveform.

After then, the UE may generate a DM-RS sequence based on the generated PN sequence at step 2006, and then, map the DM-RS sequence on physical resource allocated for transmission of the short NR PUCCH with more than 2 bits UCI at step 2008.

Various embodiments of physical resource mapping for the short NR PUCCH with more than 2 bits UCI are provided as below.

In one embodiment, the UE may generate the DM-RS sequence according to at least a maximum number of physical resource blocks (PRBs) supported for a given subcarrier spacing within a wideband component carrier (CC). For example, if the wideband CC occupies a bandwidth of 100 MHz and the given subcarrier spacing is 15 KHz, then the maximum number of PRBs may be about 275. As such, the UE may map the DM-RS sequence on the physical resource allocated for transmission of the short NR PUCCH with more than 2 bits UCI, using a common PRB indexing (i.e. from 0 to 274) with regard to the wideband CC.

In an example, the given subcarrier spacing Δf may have other value depending on μ, according to the table as below:

| μ | Δf = $2^\mu$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In another embodiment, the UE may generate the DM-RS sequence according to at least a total number of PRBs supported for a given subcarrier spacing within a configured bandwidth part (BWP), for example 10 MHz or 20 MHz. As such, the UE may map the DM-RS sequence on the physical resource allocated for transmission of the short NR PUCCH with more than 2 bits UCI, using a UE-specific PRB indexing for the given subcarrier spacing within the configured BWP.

In still another embodiment, the UE may generate the DM-RS sequence according to at least a number of PRBs allocated in frequency domain for transmission of the short PUCCH with more than 2 bits UCI, and directly map the DM-RS sequence on the allocated PRBs.

In case of the short NR PUCCH spanning 2 symbols, the DM-RS sequence may be generated according to (i) any of said maximum number of PRBs within the wideband CC, said total number of PRBs within the configured BWP and said number of allocated PRBs, and additionally according to (ii) a number of symbols (i.e. "2" in this case) allocated in time domain for transmission of the short NR PUCCH. After the modulation, the DM-RS sequence may be mapped on the DM-RS REs in allocated resource for each symbol of the short NR PUCCH transmission.

Figure 21:
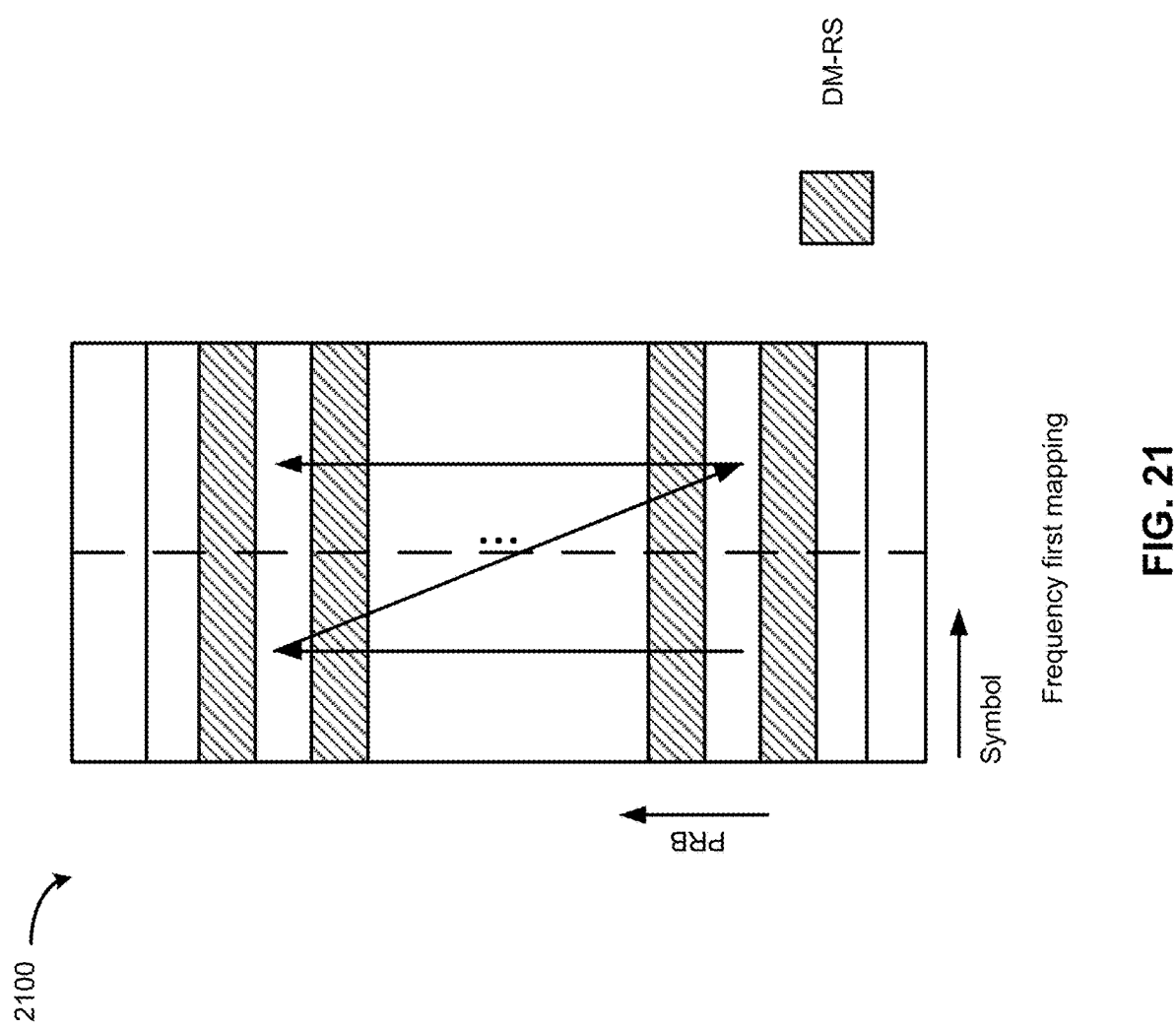
FIG. 21 is a diagram illustrating an example of frequency-first mapping of DM-RS sequence in accordance with some embodiments.
Figure 22:
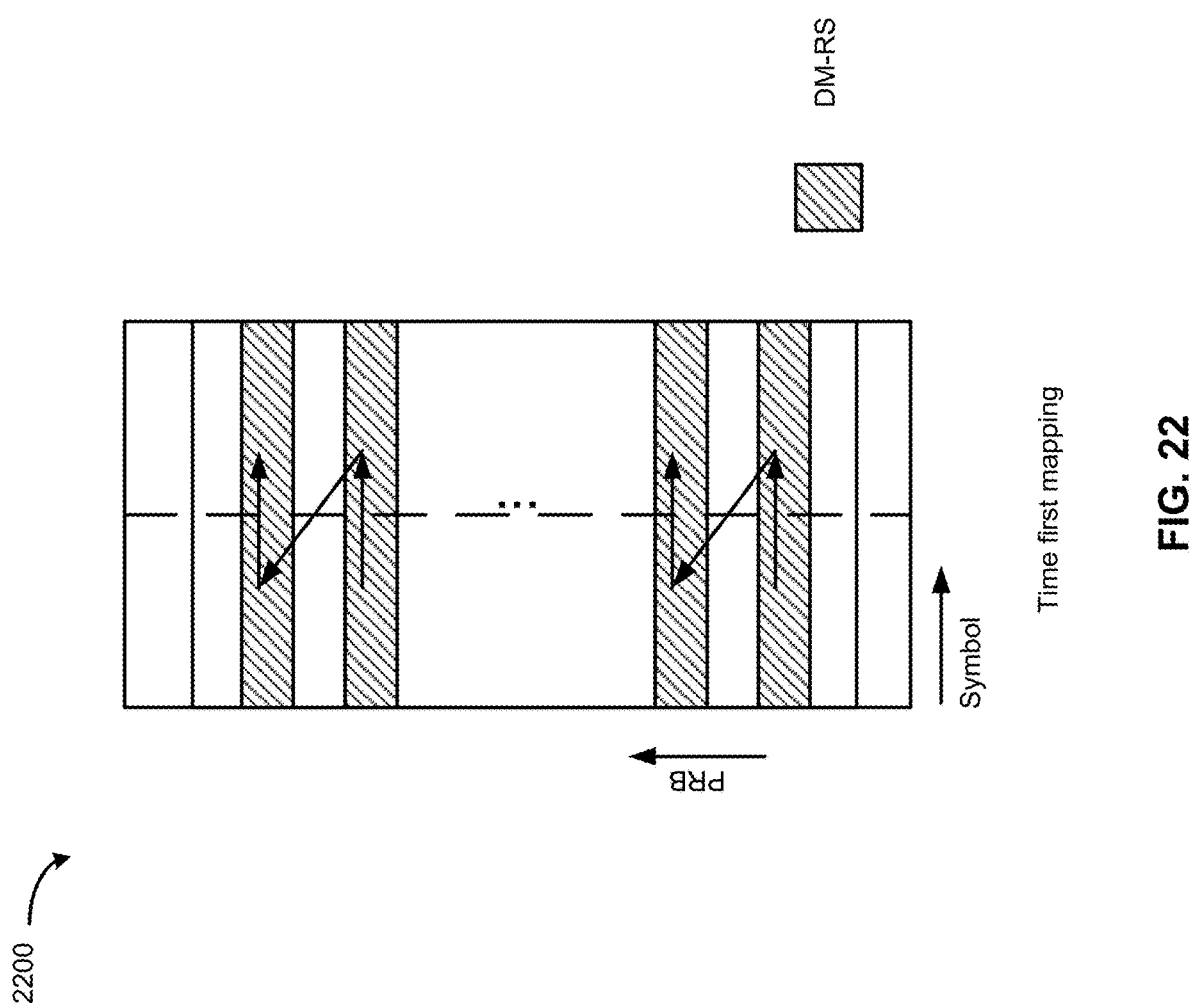
FIG. 22 is a diagram illustrating an example of time-first mapping of DM-RS sequence in accordance with some embodiments.

FIG. 21 is a diagram illustrating an example of frequency-first mapping of DM-RS sequence in accordance with some embodiments. FIG. 22 is a diagram illustrating an example of time-first mapping of DM-RS sequence in accordance with some embodiments. In these examples, localized resource is allocated for the short NR PUCCH.

In case of the short NR PUCCH spanning one symbol, the DM-RS sequence may be mapped on the DM-RS REs in the allocated resource for transmission of the short NR PUCCH, in the frequency-first mapping manner, i.e. being mapped on the DM-RS REs for this symbol in the frequency ascending or descending order.

In case of the short NR PUCCH spanning two symbols, either time-first mapping or frequency-first mapping can be employed to map the DM-RS sequence on the DM-RS REs in the allocated resource for transmission of the short NR PUCCH.

In an example, whether to select the time-first mapping manner or frequency-first mapping manner may be configured by higher layers, via NR minimum system information (MSI), NR remaining minimum system information (RMSI), NR other system information (OSI), radio resource control (RRC) signaling or the like.

When employing the frequency-first mapping of FIG. 21, the DM-RS sequence may be firstly mapped on the DM-RS REs for the first symbol in the frequency ascending or descending order, and then be mapped on the DM-RS REs for the second symbol in a frequency ascending or descending order only after all of the DM-RS REs for the first symbol are exhausted.

When employing the time-first mapping of FIG. 22, the DM-RS sequence may be firstly mapped on the DM-RS REs of the lowest subcarrier in a time ascending order (i.e. for the first symbol and then for the second symbol), and next, be mapped on the DM-RS REs of the second lowest subcarrier in the time ascending order.

In an example, the above mechanism can be applied for the case when distributed transmission is employed for the short NR PUCCH spanning 1 or 2 symbols or frequency hopping may be applied for the transmission of the 2-symbol short NR PUCCH.

In addition, in order to support multiple user-multiple input multiple output (MU-MIMO), orthogonal cover code (OCC) may be used to enhance the DM-RS sequence design for the short NR PUCCH with more than 2 bits UCI.

In some embodiments, OCC may be applied to the DM-RS REs within 1 PRB (1-symbol duration) or within 2 PRBs (2-symbol duration) to support the orthogonal MU-MIMO.

Figure 23:
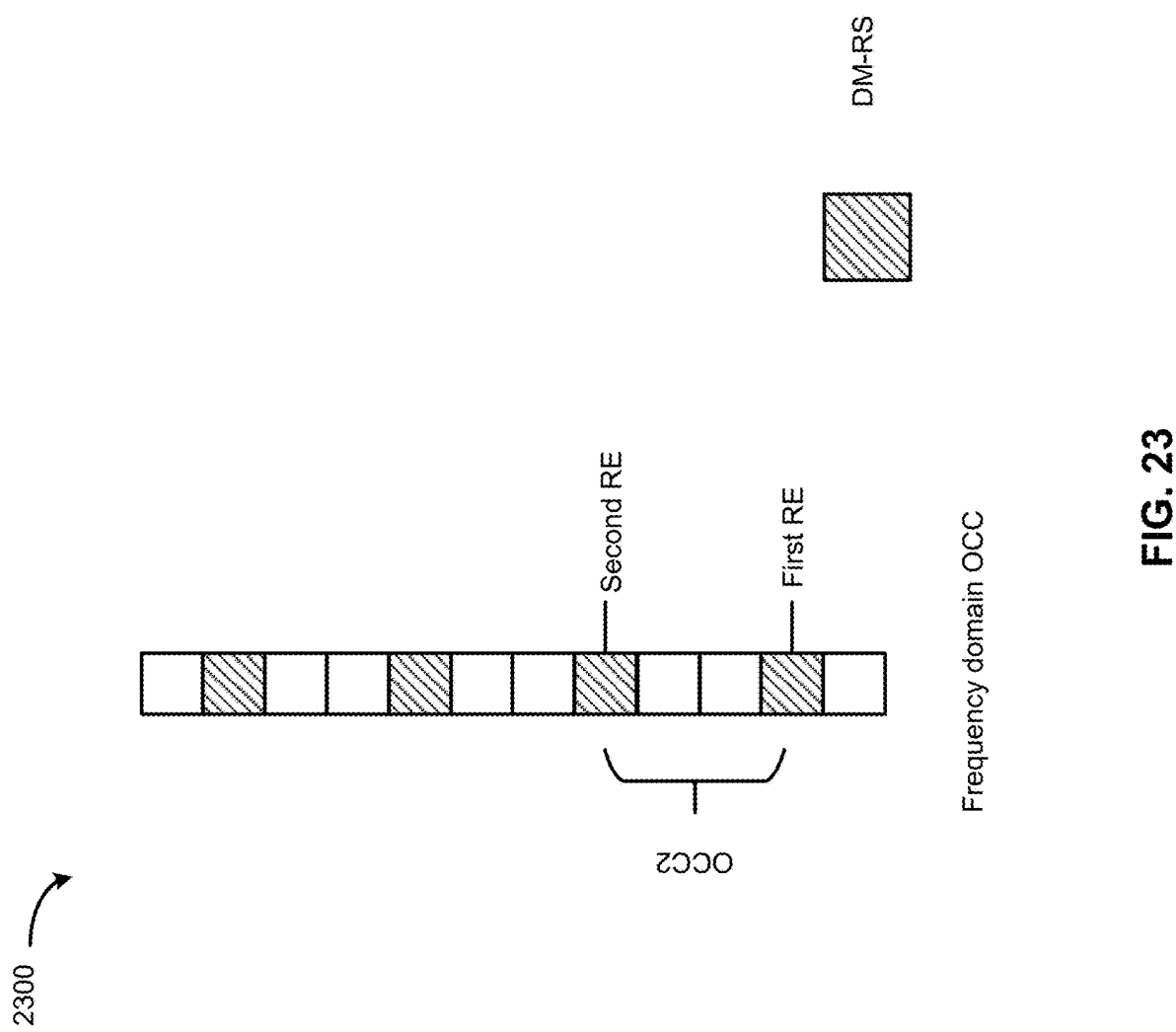
FIG. 23 illustrates an example of applying orthogonal cover code (OCC) to the DM-RS REs within 1 physical resource block (PRB).

FIG. 23 illustrates an example of applying OCC to the DM-RS REs within 1 PRB (i.e. frequency domain OCC). In this example, OCC with length of 2 bits may be used to define two orthogonal DM-RS sequences. For example, OCC=[1 1] and [1-1] may be used to support orthogonal MU-MIMO. After generating DM-RS sequences for two UEs (e.g. UE1 and UE2), [1 1] can be applied to the DM-RS sequence for UE1 and [1-1] may be applied to the DM-RS sequence for UE2. As a result, for UE1, the DM-RS sequence on the first RE may be multiplied by 1 and the DM-RS sequence on the second RE may be multiplied by 1, and for UE2, the DM-RS sequence on the first RE may be multiplied by 1 and the DM-RS sequence on the second RE may be multiplied by −1.

Figure 24:
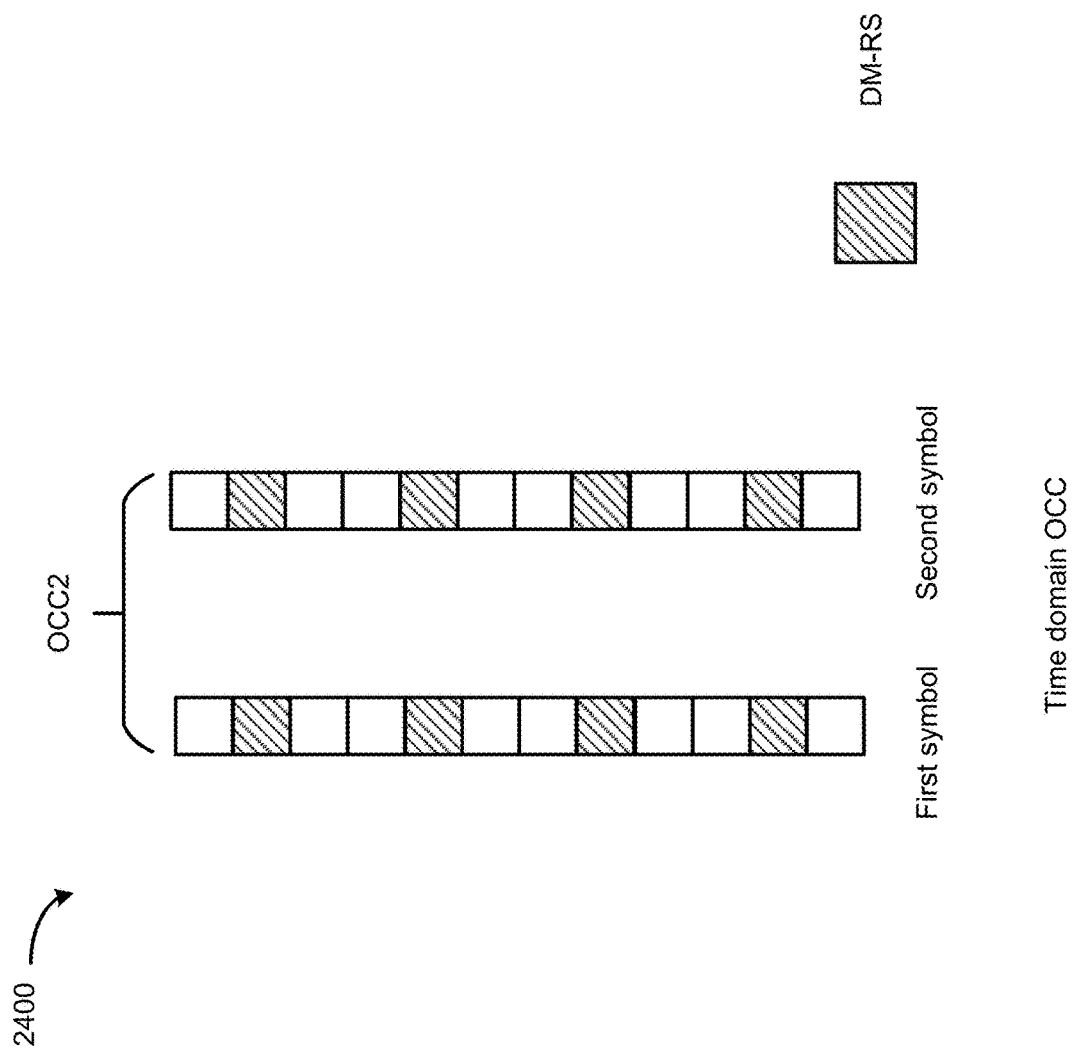
FIG. 24 illustrates an example of applying OCC to the DM-RS REs within 2 PRBs.

FIG. 24 illustrates an example of applying OCC to the DM-RS REs within 2 PRBs (i.e. time domain OCC). In this example, frequency mapping with the same sequence value in each symbol may be employed. For example, OCC with length of 2 bits is applied to define two orthogonal DM-RS sequences. In one example, OCC=[1 1] and [1−1] may be used to support orthogonal MU-MIMO. After generating DM-RS for two UEs (e.g. UE1 and UE2), [1 1] may be applied to DM-RS sequence for UE1 and [1−1] may be applied to DM-RS sequence for UE2. For UE1, the DM-RS sequence on the first symbol may be multiplied by 1 and the DM-RS sequence on the second symbol may be multiplied by 1. For UE2, the DM-RS sequence on the first symbol may be multiplied by 1 and the DM-RS sequence on the second symbol may be multiplied by −1. It is to be noted that the frequency domain OCC may also be applicable in this case. Moreover, said OCC may have any suitable length.

In addition, when applying the OCC to the DM-RS sequence in frequency domain or in time domain, the initialization seed for the generation of DM-RS sequence may be defined with same scrambling ID and without the UE-specific parameter (e.g., UE ID or C-RNTI), in order to support orthogonal MU-MIMO.

In an example, at least some of the UEs transmitting at the same position may use the same UE ID or the same scrambling ID. In other word, the DM-RS sequences for the UEs are the same, and the OCC may be used to distinguish these UEs.

Note that the OCC used for transmission of DM-RS sequence on the short NR PUCCH may be configured by higher layers via UE specific RRC signaling, or dynamically indicated in the DCI or a combination thereof. Alternatively, it may be determined for different UCI type. For instance, for short PUCCH carrying HARQ-ACK feedback, OCC used for the transmission of DM-RS sequences may be dynamically indicated in the DCI, while for short PUCCH carrying CSI report, OCC used for the transmission of DM-RS sequences may be configured by higher layers via RRC signaling.

In accordance with some embodiments, a machine readable medium may store instructions associated with any example of the method 2000 that, when executed, may cause a UE to perform the steps of any example of the method 2000.

In accordance with some embodiments, an apparatus may comprise various function modules for performing the steps of any example for the method 2000.

In some embodiments, the electronic device(s), network(s), system(s), chip(s) or component(s), or portions or implementations thereof, of FIG. 2, FIG. 3 or other figures herein may be configured to perform one or more processes, techniques, or methods as described herein, or portions thereof.

It should be noted that, some embodiments of the present disclosure are discussed in the context of 5G network and New Radio (NR). However, persons skilled in the art would understand that these embodiments possibly are applicable to other networks such as LTE, LTE-Advanced, or even applicable to coexistence of LTE, LTE-Advanced and NR.

Some non-limiting examples are provided below. The examples herein may include subject matters such as apparatus, user device, method, means for performing the steps of a method, machine-readable medium including instructions that, when executed by a machine such as a processor with memory, an application-specific integrated circuit (ASIC), a field programmable gate array (FPGA) or the like, cause the machine to perform the steps of the method, network node and communication system.

EXAMPLES

Example 1 is an apparatus for a user equipment (UE), comprising: an interface configured to enable the UE to communicate with two or more transmission reception points (TRPs); and a processor that is configured to generate uplink control information (UCI) for each of the TRPs, schedule single or multiple uplink channels to carry the UCI, so that the UCI is transmitted individually or in combination to the TRPs via the interface, wherein the uplink channels comprise new radio (NR) physical uplink control channel (PUCCH) and/or NR physical uplink shared channel (PUSCH).

Example 2 may comprise the subject matter of Example 1, wherein said UCI comprises hybrid automatic repeat request (HARQ) acknowledgement/negative acknowledgement (ACK/NACK) feedback and/or channel state information (CSI) report.

Example 3 may comprise the subject matter of Example 1 or 2, wherein the processor is further configured to schedule the multiple uplink channels each carrying the UCI generated for one of the TRPs, wherein the multiple uplink channels are multiplexed in a time division multiplexing (TDM) manner, or in a frequency division multiplexing (FDM) manner.

Example 4 may comprise the subject matter of Example 3, wherein the processor is further configured to schedule the multiple uplink channels according to resource allocation in time domain or in frequency domain, which is configured by higher layers and/or dynamically configured by downlink control information (DCI) from the TRPs.

Example 5 may comprise the subject matter of Example 4, wherein information regarding the resource allocation in time domain is exchanged between the TRPs in a semi-static or dynamic manner; or wherein the resource allocation in frequency domain is contiguous, based on semi-static or dynamic coordination between the TRPs.

Example 6 may comprise the subject matter of Example 3, wherein the processor is further configured to select one of the multiple uplink channels for transmission and drop the others, when the UE supports only one transmit (Tx) beam or antenna port, in case of the FDM manner.

Example 7 may comprise the subject matter of Example 6, wherein the dropping is based on a dropping rule or priority rule, which is predefined in 3GPP specification or configured by higher layers; or wherein the dropping is based on channel quality of the uplink channels.

Example 8 may comprise the subject matter of Example 1, wherein the processor is further configured to: combine the UCI generated for each of the TRPs into a bit set, wherein each UCI corresponds to a subset of said bit set; and schedule the single uplink channel to carry said bit set, wherein said bit set is to be transmitted to one of the TRPs which is to forward said bit set to the remaining TRPs, or wherein said bit set is to be transmitted simultaneously to each of the TRPs if the UE supports multiple transmit (Tx) beams.

Example 9 may comprise the subject matter of Example 1, wherein the processor is further configured to: combine the UCI generated for each of the TRPs into a bit set, wherein each UCI corresponds to a subset of said bit set; and schedule the multiple uplink channels each carrying said bit set, wherein said bit set is to be transmitted simultaneously to each of the TRPs if the UE supports multiple transmit (Tx) beams, or wherein said bit set is to be transmitted to each of the TRPs by means of beam sweeping if the UE only supports single Tx beam.

Example 10 may comprise the subject matter of Example 8 or 9, wherein TRP index for said bit set is predefined in 3GPP specification or configured by higher layers, or wherein said bit set only includes the UCI generated for the TRPs for the corresponding HARQ-ACK feedback.

Example 11 may comprise the subject matter of Example 8 or 9, wherein a number of bits in each subset is configured by higher layers and/or indicated by downlink control information (DCI) from the TRPs.

Example 12 may comprise the subject matter of Example 8 or 9, wherein in case of scheduling a PUCCH to carry said bit set, the processor is further configured to dynamically select a format of the PUCCH based on downlink control information (DCI) from the TRPs, according to a number of bits in said bit set.

Example 13 is a machine readable medium comprising instructions that, when executed, cause a user equipment (UE) to generate uplink control information (UCI) for each of two or more transmission reception points (TRPs) communicating with the UE, and schedule single or multiple uplink channels to carry the UCI, so that the UCI is transmitted individually or in combination to the TRPs via the interface, wherein the uplink channels comprise new radio (NR) physical uplink control channel (PUCCH) and/or NR physical uplink shared channel (PUSCH).

Example 14 may comprise the subject matter of Example 13, wherein said UCI comprises hybrid automatic repeat request (HARQ) acknowledgement/negative acknowledgement (ACK/NACK) feedback and/or channel state information (CSI) report.

Example 15 may comprise the subject matter of Example 13 or 14, wherein the instructions, when executed, further cause the UE to schedule the multiple uplink channels each carrying the UCI generated for one of the TRPs, wherein the multiple uplink channels are multiplexed in a time division multiplexing (TDM) manner, or in a frequency division multiplexing (FDM) manner.

Example 16 may comprise the subject matter of Example 15, wherein the instructions, when executed, further cause the UE to schedule the multiple uplink channels according to resource allocation in time domain or in frequency domain, which is configured by higher layers and/or dynamically configured by downlink control information (DCI) from the TRPs.

Example 17 may comprise the subject matter of Example 16, wherein information regarding the resource allocation in time domain is exchanged between the TRPs in a semi-static or dynamic manner; or wherein the resource allocation in frequency domain is contiguous, based on semi-static or dynamic coordination between the TRPs.

Example 18 may comprise the subject matter of Example 15, wherein the instructions, when executed, further cause the UE to select one of the multiple uplink channels for transmission and drop the others, when the UE supports only one transmit (Tx) beam or antenna port, in case of the FDM manner.

Example 19 may comprise the subject matter of Example 18, wherein the dropping is based on a dropping rule or priority rule, which is predefined in 3GPP specification or configured by higher layers; or wherein the dropping is based on channel quality of the uplink channels.

Example 20 may comprise the subject matter of Example 13, wherein the instructions, when executed, further cause the UE to combine the UCI generated for each of the TRPs into a bit set, wherein each UCI corresponds to a subset of said bit set, and schedule the single uplink channel to carry said bit set, wherein said bit set is to be transmitted to one of the TRPs which is to forward said bit set to the remaining TRPs, or wherein said bit set is to be transmitted simultaneously to each of the TRPs if the UE supports multiple transmit (Tx) beams.

Example 21 may comprise the subject matter of Example 13, wherein the instructions, when executed, further cause the UE to: combine the UCI generated for each of the TRPs into a bit set, wherein each UCI corresponds to a subset of said bit set; and schedule the multiple uplink channels each carrying said bit set, wherein said bit set is to be transmitted simultaneously to each of the TRPs if the UE supports multiple transmit (Tx) beams, or wherein said bit set is to be transmitted to each of the TRPs by means of beam sweeping if the UE only supports single Tx beam.

Example 22 may comprise the subject matter of Example 20 or 21, wherein TRP index for said bit set is predefined in 3GPP specification or configured by higher layers, or wherein said bit set only includes the UCI generated for the TRPs for the corresponding HARQ-ACK feedback.

Example 23 may comprise the subject matter of Example 20 or 21, wherein a number of bits in each subset is configured by higher layers and/or indicated by downlink control information (DCI) from the TRPs.

Example 24 may comprise the subject matter of Example 20 or 21, wherein the instructions, when executed, further cause the UE to dynamically select a format of the PUCCH based on downlink control information (DCI) from the TRPs, according to a number of bits in said bit set, in case of scheduling a PUCCH to carry said bit set.

Example 25 is an apparatus for a network node having two or more transmission reception points (TRPs), comprising a processor configured to: enable the two or more TRPs to communicate with a UE and to receive a bit set via single or multiple uplink channels, said bit set including multiple subsets each corresponding to uplink control information (UCI) for one of the TRPs; coordinate between the two or more TRPs; and generate downlink control information (DCI) for the UE, wherein the uplink channels comprise new radio (NR) physical uplink control channel (PUCCH) and/or NR physical uplink shared channel (PUSCH).

Example 26 may comprise the subject matter of Example 25, wherein said DCI comprises one or more of: information indicating resource allocation in time domain for the uplink channels; information indicating resource allocation in frequency domain for the uplink channels; information indicating a number of bits in each of the multiple subsets; and information indicating a format of the PUCCH carrying the bit set.

Example 27 is a user equipment (UE) comprising the subject matter of Example 1 and a radio frequency (RF) circuitry.

Example 28 is a network node comprising the subject matter of Example 25 or 26, and two or more transmission reception points (TRPs).

Example 29 is a network node comprising the subject matter of Example 25 or 26, and a radio frequency (RF) circuitry.

Example 30 is a communication system comprising the subject matter of Example 27 and the subject matter of Example 28 or 29.

Example 31 is a method employable at a UE to facilitate multi-TRP operation, comprising the steps of: generating uplink control information (UCI) for each of two or more TRPs communicating with the UE; and scheduling single or multiple uplink channels to carry the UCI, so that the UCI may be transmitted over the scheduled uplink channels individually or in combination to the TRPs, via an interface, wherein the uplink channels may comprise NR PUCCH and/or NR PUSCH.

Example 32 may comprise the subject matter of Example 31, and one or more additional steps or operations as discussed in the disclosure.

Example 33 is an apparatus comprising various means or functional modules for performing the steps of the method of Example 31 or 32.

Example 34 is a method employable at a network node to facilitate multi-TRP operation, comprising the steps of: enabling two or more TRPs in the network node to communicate with a UE and to receive a bit set via single or multiple uplink channels, said bit set including multiple subsets each corresponding to uplink control information (UCI) for one of the TRPs; coordinating between the two or more TRPs; and generating downlink control information (DCI) for the UE, wherein the uplink channels comprise NR PUCCH and/or NR PUSCH.

Example 35 may comprise the subject matter of Example 34, and one or more additional steps or operations as discussed in the disclosure.

Example 36 is an apparatus comprising various means or functional modules for performing the steps of the method of Example 34 or 35.

Example 37 is an apparatus for a user equipment (UE) operable to communicate with a new radio (NR) network node, comprising a processor configured to: generate a pseudo noise (PN) sequence based on an initialization seed; generate a demodulation reference signal (DM-RS) sequence based on the PN sequence; and map the DM-RS sequence on physical resource allocated for transmission of a short physical uplink control channel (PUCCH) with more than 2 bits uplink control information (UCI).

Example 38 may comprise the subject matter of Example 37, wherein the processor is further configured to define said initialization seed as a function of one or more of the following parameters: slot index or mini-slot index for transmission of the short PUCCH; symbol index or starting symbol index for transmission of the short PUCCH; scrambling identity (ID), or physical cell ID when the scrambling ID is not available; beam ID; and UE-specific parameter.

Example 39 may comprise the subject matter of Example 38, wherein the UE-specific parameter comprises a bandwidth part (BWP) ID, an offset parameter, or a UE ID including a cell radio network temporary identifier (C-RNTI) of the UE.

Example 40 may comprise the subject matter of Example 38 or 39, wherein the scrambling ID is configured by higher layers via NR minimum system information (MSI), NR remaining minimum system information (RMSI), NR other system information (OSI) or radio resource control (RRC) signaling, and/or is dynamically indicated by downlink control information (DCI) from the network node.

Example 41 may comprise the subject matter of Example 38 or 39, wherein the scrambling ID is configured independently for different bandwidth parts (BWPs) being active within a system bandwidth, and/or for different types of the UCI.

Example 42 may comprise the subject matter of Example 38 or 39, wherein in case of the short PUCCH spanning two symbols, the initialization seed is defined independently for each symbol as a function of its respective symbol index.

Example 43 may comprise the subject matter of Example 41, wherein the UCI carried by the short PUCCH is a hybrid automatic repeat request (HARQ) acknowledgement/negative acknowledgement (ACK/NACK) feedback for a corresponding physical downlink shared channel (PDSCH) from the network node, and wherein the scrambling ID used for the DM-RS sequence on the short PUCCH is the same as that for the DM-RS sequence on the PDSCH, or is dynamically switched according to downlink control information (DCI) from the network node.

Example 44 may comprise the subject matter of Example 38 or 39, wherein the scrambling ID is configured based on an index of a set of {P0, alpha} for uplink power control and/or pathloss.

Example 45 may comprise the subject matter of Example 37, wherein the processor is further configured to: generate same PN sequence for the DM-RS sequence on the short PUCCH and on a PUSCH with cyclic prefix-orthogonal frequency division multiplexing (CP-OFDM) based waveform.

Example 46 may comprise the subject matter of Example 37, 38 or 39, wherein the processor is adapted to generate the DM-RS sequence according to at least a maximum number of physical resource blocks (PRBs) supported for a given subcarrier spacing within a wideband component carrier (CC), and map the DM-RS sequence on said physical resource using a common PRB indexing with regard to the wideband CC. In an alternative example, the processor is adapted to generate the DM-RS sequence according to at least a total number of PRBs supported for a given subcarrier spacing within a configured bandwidth part (BWP), and map the DM-RS sequence on said physical resource using a UE-specific PRB indexing for the given subcarrier spacing within the configured BWP. In an alternative example, the processor is adapted to generate the DM-RS sequence according to at least a number of PRBs allocated in frequency domain for transmission of the short PUCCH, and map the DM-RS sequence on the allocated PRBs.

Example 47 may comprise the subject matter of Example 46, wherein the DM-RS sequence is generated according to also a number of symbols allocated in time domain for transmission of the short PUCCH.

Example 48 may comprise the subject matter of Example 47, wherein the processor is further configured to select one of a time-first mapping manner and a frequency-first mapping manner to map the DM-RS sequence on said physical resource, in case of the short PUCCH spanning two symbols.

Example 49 may comprise the subject matter of Example 47, wherein the processor is further configured to employing a time-first mapping manner or a frequency-first mapping manner which is configured by higher layers via NR minimum system information (MSI), NR remaining minimum system information (RMSI), NR other system information (OSI) or radio resource control (RRC) signaling.

Example 50 may comprise the subject matter of Example 38 or 39, wherein the processor is further configured to apply an orthogonal cover code (OCC) to the DM-RS sequence in frequency domain or in time domain, when the initialization seed is defined with same scrambling ID and without said UE-specific parameter.

Example 51 may comprise the subject matter of Example 50, wherein the OCC is configured by higher layers or dynamically indicated in downlink control information (DCI) or a combination thereof.

Example 52 is a machine readable medium comprising instructions that, when executed, cause a user equipment (UE) operable to communicate with a new radio (NR) network node to: generate a pseudo noise (PN) sequence based on an initialization seed; generate a demodulation reference signal (DM-RS) sequence based on the PN sequence; and map the DM-RS sequence on physical resource allocated for transmission of a short physical uplink control channel (PUCCH) with more than 2 bits uplink control information (UCI).

Example 53 may comprise the subject matter of Example 52, wherein the instructions, when executed, further cause the UE to define said initialization seed as a function of one or more of the following parameters: slot index or mini-slot index for transmission of the short PUCCH; symbol index or starting symbol index for transmission of the short PUCCH; scrambling identity (ID), or physical cell ID when the scrambling ID is not available; beam ID; and UE-specific parameter.

Example 54 may comprise the subject matter of Example 53, wherein the UE-specific parameter comprises a bandwidth part (BWP) ID, an offset parameter, or a UE ID including a cell radio network temporary identifier (C-RNTI) of the UE.

Example 55 may comprise the subject matter of Example 53 or 54, wherein the scrambling ID is configured by higher layers via NR minimum system information (MSI), NR remaining minimum system information (RMSI), NR other system information (OSI) or radio resource control (RRC) signaling, and/or is dynamically indicated by downlink control information (DCI) from the network node.

Example 56 may comprise the subject matter of Example 53 or 54, wherein the scrambling ID is configured independently for different bandwidth parts (BWPs) being active within a system bandwidth, and/or for different types of the UCI.

Example 57 may comprise the subject matter of Example 53 or 54, wherein in case of the short PUCCH spanning two symbols, the initialization seed is defined independently for each symbol as a function of its respective symbol index.

Example 58 may comprise the subject matter of Example 56, wherein the UCI carried by the short PUCCH is a hybrid automatic repeat request (HARQ) acknowledgement/negative acknowledgement (ACK/NACK) feedback for a corresponding physical downlink shared channel (PDSCH) from the network node; and wherein the scrambling ID used for the DM-RS sequence on the short PUCCH is the same as that for the DM-RS sequence on the PDSCH, or is dynamically switched according to downlink control information (DCI) from the network node.

Example 59 may comprise the subject matter of Example 53 or 54, wherein the scrambling ID is configured based on an index of a set of {P0, alpha} for uplink power control and/or pathloss.

Example 60 may comprise the subject matter of Example 52, wherein the instructions, when executed, further cause the UE to generate same PN sequence for the DM-RS sequence on the short PUCCH and on a PUSCH with cyclic prefix-orthogonal frequency division multiplexing (CP-OFDM) based waveform.

Example 61 may comprise the subject matter of Example 52, 53 or 54, wherein the instructions, when executed, further cause the UE to generate the DM-RS sequence according to at least a maximum number of physical resource blocks (PRBs) supported for a given subcarrier spacing within a wideband component carrier (CC), and map the DM-RS sequence on said physical resource using a common PRB indexing with regard to the wideband CC. In an alternative example, the instructions, when executed, further cause the UE to generate the DM-RS sequence according to at least a total number of PRBs supported for a given subcarrier spacing within a configured bandwidth part (BWP), and map the DM-RS sequence on said physical resource using a UE-specific PRB indexing for the given subcarrier spacing within the configured BWP. In an alternative example, the instructions, when executed, further cause the UE to generate the DM-RS sequence according to at least a number of PRBs allocated in frequency domain for transmission of the short PUCCH, and map the DM-RS sequence on the allocated PRBs.

Example 62 may comprise the subject matter of Example 61, wherein the DM-RS sequence is generated according to also a number of symbols allocated in time domain for transmission of the short PUCCH.

Example 63 may comprise the subject matter of Example 62, wherein the instructions, when executed, further cause the UE to select one of a time-first mapping manner and a frequency-first mapping manner to map the DM-RS sequence on said physical resource, in case of the short PUCCH spanning two symbols.

Example 64 may comprise the subject matter of Example 62, wherein the instructions, when executed, further cause the UE to employing a time-first mapping manner or a frequency-first mapping manner which is configured by higher layers via NR minimum system information (MSI), NR remaining minimum system information (RMSI), NR other system information (OSI) or radio resource control (RRC) signaling.

Example 65 may comprise the subject matter of Example 53 or 54, wherein the instructions, when executed, further cause the UE to apply an orthogonal cover code (OCC) to the DM-RS sequence in frequency domain or in time domain, when the initialization seed is defined with same scrambling ID and without said UE-specific parameter.

Example 66 may comprise the subject matter of Example 65, wherein the OCC is configured by higher layers or dynamically indicated in downlink control information (DCI) or a combination thereof.

Example 67 is a user equipment (UE) comprising the subject matter of Example 37 and a radio frequency (RF) circuitry.

Example 68 is a network node adapted to receive the short NR PUCCH from the UE of Example 67 and use the DM-RS derived from the short NR PUCCH for channel estimation and demodulation.

Example 69 is a communication system comprising the subject matter of Example 67 and the subject matter of Example 68.

Example 70 is a method employable at a UE, comprising the steps of generating a pseudo noise (PN) sequence based on an initialization seed; generating a demodulation reference signal (DM-RS) sequence based on the PN sequence;

and mapping the DM-RS sequence on physical resource allocated for transmission of a short PUCCH with more than 2 bits UCI.

Example 71 may comprise the subject matter of Example 70, and one or more additional steps or operations as discussed in the disclosure.

Example 72 is an apparatus comprising various means or functional modules for performing the steps of the method of Example 70 or 71.

Example 73 is a method employable at a network node of Example 68, comprising the steps of receiving the short NR PUCCH from the UE of Example 67, and using the DM-RS derived from the short NR PUCCH for channel estimation and demodulation.

Example 74 is an apparatus comprising various means or functional modules for performing the steps of the method of Example 73.

Example 75 may include a signal as described in relation to any of Examples 1 to 74.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as recognized by those skilled in the relevant art.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus for a user equipment (UE) operable to communicate with a new radio (NR) network node, comprising:
a processor configured to:
generate a pseudo noise (PN) sequence based on an initialization seed;
generate a demodulation reference signal (DM-RS) sequence based on the PN sequence; and
map the DM-RS sequence on physical resource allocated for transmission of a short physical uplink control channel (PUCCH) spanning one or two symbols with more than 2 bits uplink control information (UCI);
wherein the initialization seed is as a function of the following parameters:
slot index or mini-slot index for transmission of the short PUCCH;
symbol index or starting symbol index for transmission of the short PUCCH; and
scrambling identity (ID), or physical cell ID when the scrambling ID is not available;
wherein the scrambling ID is configured independently for different bandwidth parts (BWPs) being active within a system bandwidth.

2. The apparatus of claim 1, wherein the initialization seed is further as a function of a UE-specific parameter, wherein the UE-specific parameter comprises a bandwidth part (BWP) ID, an offset parameter, or a UE ID including a cell radio network temporary identifier (C-RNTI) of the UE.

3. The apparatus of claim 1, wherein the scrambling ID is configured by higher layers via NR minimum system information (MSI), NR remaining minimum system information (RMSI), NR other system information (OSI) or radio resource control (RRC) signaling, and/or is dynamically indicated by downlink control information (DCI) from the network node.

4. The apparatus of claim 1, wherein in case of the short PUCCH spanning two symbols, the initialization seed is defined independently for each symbol as a function of its respective symbol index.

5. The apparatus of claim 1, wherein the UCI carried by the short PUCCH is a hybrid automatic repeat request (HARQ) acknowledgement/negative acknowledgement (ACK/NACK) feedback for a corresponding physical downlink shared channel (PDSCH) from the network node; and
wherein the scrambling ID used for the DM-RS sequence on the short PUCCH is the same as that for the DM-RS sequence on the PDSCH, or is dynamically switched according to downlink control information (DCI) from the network node.

6. The apparatus of claim 1, wherein the processor is adapted to:
generate the DM-RS sequence according to at least a maximum number of physical resource blocks (PRBs) supported for a given subcarrier spacing within a wideband component carrier (CC), and map the DM-RS sequence on said physical resource using a common PRB indexing with regard to the wideband CC.

7. The apparatus of claim 1, wherein the processor is adapted to generate the DM-RS sequence according to at least a total number of PRBs supported for a given subcarrier spacing within a configured bandwidth part (BWP), and map the DM-RS sequence on said physical resource using a UE-specific PRB indexing for the given subcarrier spacing within the configured BWP.

8. The apparatus of claim 1, wherein the processor is adapted to generate the DM-RS sequence according to at least a number of PRBs allocated in frequency domain for transmission of the short PUCCH, and map the DM-RS sequence on the allocated PRBs.

9. The apparatus of claim 6, wherein the DM-RS sequence is generated according to also a number of symbols allocated in time domain for transmission of the short PUCCH.

10. The apparatus of claim 9, wherein the processor is further configured to:
employ a frequency-first mapping manner to map the DM-RS sequence on said physical resource, in case of the short PUCCH spanning two symbols.

11. The apparatus of claim 1, wherein the processor is further configured to:
apply an orthogonal cover code (OCC) to the DM-RS sequence in frequency domain or in time domain, when the initialization seed is defined with same scrambling ID.

12. A non-transitory machine readable medium comprising instructions that, when executed, cause a user equipment (UE) operable to communicate with a new radio (NR) network node to:
generate a pseudo noise (PN) sequence based on an initialization seed;
generate a demodulation reference signal (DM-RS) sequence based on the PN sequence; and
map the DM-RS sequence on physical resource allocated for transmission of a short physical uplink control channel (PUCCH) spanning one or two symbols with more than 2 bits uplink control information (UCI);
wherein the initialization seed is as a function of the following parameters:
slot index or mini-slot index for transmission of the short PUCCH;
symbol index or starting symbol index for transmission of the short PUCCH; and
scrambling identity (ID), or physical cell ID when the scrambling ID is not available;
wherein the scrambling ID is configured independently for different bandwidth parts (BWPs) being active within a system bandwidth.

13. The non-transitory machine readable medium of claim 12, wherein the initialization seed is further as a function of a UE-specific parameter, wherein the UE-specific parameter comprises a bandwidth part (BWP) ID, an offset parameter, or a UE ID including a cell radio network temporary identifier (C-RNTI) of the UE.

14. The non-transitory machine readable medium of claim 12, wherein the scrambling ID is configured by higher layers via NR minimum system information (MSI), NR remaining minimum system information (RMSI), NR other system information (OSI) or radio resource control (RRC) signaling, and/or is dynamically indicated by downlink control information (DCI) from the network node.

15. The non-transitory machine readable medium of claim 12, wherein in case of the short PUCCH spanning two symbols, the initialization seed is defined independently for each symbol as a function of its respective symbol index.

16. The non-transitory machine readable medium of claim 12, wherein the UCI carried by the short PUCCH is a hybrid automatic repeat request (HARQ) acknowledgement/negative acknowledgement (ACK/NACK) feedback for a corresponding physical downlink shared channel (PDSCH) from the network node; and
wherein the scrambling ID used for the DM-RS sequence on the short PUCCH is the same as that for the DM-RS sequence on the PDSCH or is dynamically switched according to downlink control information (DCI) from the network node.

17. The non-transitory machine readable medium of claim 12, wherein the instructions, when executed, further cause the UE to:
generate the DM-RS sequence according to at least a maximum number of physical resource blocks (PRBs) supported for a given subcarrier spacing within a wideband component carrier (CC), and map the DM-RS sequence on said physical resource using a common PRB indexing with regard to the wideband CC.

18. The non-transitory machine readable medium of claim 12, wherein the instructions, when executed, further cause the UE to:
generate the DM-RS sequence according to at least a total number of PRBs supported for a given subcarrier spacing within a configured bandwidth part (BWP), and map the DM-RS sequence on said physical resource using a UE-specific PRB indexing for the given subcarrier spacing within the configured BWP.

19. The non-transitory machine readable medium of claim 12, wherein the instructions, when executed, further cause the UE to:
generate the DM-RS sequence according to at least a number of PRBs allocated in frequency domain for transmission of the short PUCCH, and map the DM-RS sequence on the allocated PRBs.

20. The non-transitory machine readable medium of claim 17, wherein the DM-RS sequence is generated according to also a number of symbols allocated in time domain for transmission of the short PUCCH.

21. The non-transitory machine readable medium of claim 20, wherein the instructions, when executed, further cause the UE to:
employ a frequency-first mapping manner to map the DM-RS sequence on said physical resource, in case of the short PUCCH spanning two symbols.

22. The non-transitory machine readable medium of claim 12, wherein the instructions, when executed, further cause the UE to:
apply an orthogonal cover code (OCC) to the DM-RS sequence in frequency domain or in time domain, when the initialization seed is defined with same scrambling ID.

* * * * *